US010298911B2

(12) United States Patent
Shuster et al.

(10) Patent No.: US 10,298,911 B2
(45) Date of Patent: May 21, 2019

(54) VISUALIZATION OF SPATIAL AND OTHER RELATIONSHIPS

(71) Applicant: Empire Technology Development LLC, Wilmington, DE (US)

(72) Inventors: Gary Stephen Shuster, Fresno, CA (US); Charles Marion Curry, Fresno, CA (US)

(73) Assignee: Empire Technology Development LLC, Wilmington, DE (US)

( * ) Notice: Subject to any disclaimer, the term of this patent is extended or adjusted under 35 U.S.C. 154(b) by 341 days.

(21) Appl. No.: 14/614,763

(22) Filed: Feb. 5, 2015

(65) Prior Publication Data

US 2015/0279022 A1    Oct. 1, 2015

Related U.S. Application Data

(60) Provisional application No. 61/972,693, filed on Mar. 31, 2014.

(51) Int. Cl.
| | |
|---|---|
| *H04N 13/00* | (2018.01) |
| *H04N 13/271* | (2018.01) |
| *H04N 13/293* | (2018.01) |
| *G06T 7/593* | (2017.01) |
| *H04N 13/395* | (2018.01) |

(Continued)

(52) U.S. Cl.
CPC ........... *H04N 13/271* (2018.05); *G06T 7/593* (2017.01); *H04N 13/239* (2018.05); *H04N 13/293* (2018.05); *H04N 13/332* (2018.05); *H04N 13/395* (2018.05); *G06T 2207/10012* (2013.01); *H04N 2013/0081* (2013.01); *H04N 2013/0088* (2013.01)

(58) Field of Classification Search
None
See application file for complete search history.

(56) References Cited

U.S. PATENT DOCUMENTS

| 8,135,227 B2 | 3/2012 | Lewis et al. |
| 8,593,565 B2 | 11/2013 | Shuster |

(Continued)

OTHER PUBLICATIONS

Pucihar, K. C. et al., "Creating a Stereoscopic Magic-lens to Improve Depth Perception in Handheld Augmented Reality," Proceedings in the ACM Digital Library Mobile HCI 2013, Munich, Germany, pp. 448-451, Aug. 27-30, 2013.

(Continued)

*Primary Examiner* — Nurun N Flora

(57) ABSTRACT

Technologies are generally described for visualizing spatial relationships and other relationships. In one example, a method includes capturing, by a system comprising a processor, a stereoscopic image based on a view area from a reference point determined by the system. The stereoscopic image comprises objects. The method also includes determining respective depth indication data for a set of the objects based on respective depths of the set of the objects. The method also includes converting the stereoscopic image to a monocular image and initiating a presentation of the monocular image to a viewing device. The respective depths are respective distances determined between the reference point and the set of the objects. The monocular image comprises the depth indication data for the set of the objects and simulates depth perception.

24 Claims, 18 Drawing Sheets

(51) Int. Cl.
*H04N 13/332* (2018.01)
*H04N 13/239* (2018.01)

(56) References Cited

U.S. PATENT DOCUMENTS

| | | | | |
|---|---|---|---|---|
| 2005/0249367 A1* | 11/2005 | Bailey | ...................... | H04S 3/008 381/310 |
| 2008/0247670 A1* | 10/2008 | Tam | ...................... | G06T 7/0051 382/298 |
| 2011/0075257 A1* | 3/2011 | Hua | ...................... | G02B 27/017 359/464 |
| 2011/0093890 A1* | 4/2011 | Araki | ................. | H01R 13/6461 725/37 |
| 2012/0224062 A1* | 9/2012 | Lacoste | ................ | G01C 21/365 348/148 |
| 2014/0085446 A1 | 3/2014 | Hicks | | |
| 2015/0341616 A1* | 11/2015 | Siegel | .................. | H04N 13/026 348/54 |

OTHER PUBLICATIONS

Torres, Sr., J. C. et al., "An Obstacle Detection and Depth Information Head Mounted Display Technical Aid for Visual Impairment," accessed at: http://www.abstractsonline.com/Plan/ViewAbstract.aspx?mID=2866&sKey=6e30f5f2-c1d1-4a0e-9e62-5d6368377e36&cKey=b1fc0dba-1853-4048-b3bd-1e93e435cc25&mKey=f0fce029-9bf8-4e7c-b48e-9f17711d4a0e, May 7, 2012, 3 pages.

Toyoura, M. et al., "Mono-glass for Providing Distance Information for People Losing Sight in One Eye," Proceedings of the 11th ACM SIGGRAPH International Conference on Virtual-Reality Continuum and its Applications in Industry, pp. 39-42, 2012.

\* cited by examiner

VISUALIZATION OF SPATIAL AND OTHER RELATIONSHIPS

CROSS-REFERENCE TO RELATED APPLICATION

This application claims priority under 35 U.S.C. § 119(e) to U.S. Provisional Application No. 61/972,693, filed Mar. 31, 2014, and entitled "Improved Visualization of Spatial and Other Relationships," the entirety of which is expressly incorporated herein by reference.

TECHNICAL FIELD

The subject disclosure relates generally to visualization of spatial and other relationships.

BACKGROUND

When humans suffer an injury to one eye, are born with one eye, or have partial function in one eye, their depth perception will be impaired or absent. This happens because complete depth perception is achieved through binocular visual input. With the use of one eye, a human is only capable of gathering monocular input. In many cases, such as where one eye is capable of some level of functional vision and the other eye is capable of partial vision, where use of one eye has been lost subsequent to development of depth perception, or where only a single eye is capable of vision, it is desirable that depth perception be facilitated, emulated or regained, or that some benefits of depth perception be presented in a manner perceptible to a person without biological depth perception.

SUMMARY

In one embodiment, a method may include capturing, by a system comprising a processor, a stereoscopic image based on a view area from a reference point determined by the system. The stereoscopic image may comprise objects. The method may also include determining respective depth indication data for a set of the objects based on respective depths of the set of the objects. The respective depths may be respective distances determined between the reference point and the set of the objects. Further, the method may include converting the stereoscopic image to a monocular image. The monocular image may comprise the depth indication data for the set of the objects. The method may also include initiating a presentation of the monocular image to a viewing device, wherein the monocular image simulates depth perception.

According to another embodiment, a system may include a memory storing executable components and a processor, coupled to the memory, operable to execute or facilitate execution of one or more of the executable components. The executable components may include a distance measurement manager that may be configured to determine distance data comprising respective distances for a set of objects in stereoscopic data representing a stereoscopic view located within an area of view determined from a reference point determined by the system. The executable components may also include a conversion manager that may be configured to transform the stereoscopic data to monocular data representing a monocular view that comprises indications of the respective distances. Further, the executable components may include an output manager that may be configured to convey the monocular data to a display. The monocular view of the monocular data facilitates simulation of depth perception of the set of objects on the display.

In a further embodiment, a computer-readable storage device may include executable instructions that, in response to execution, cause a system comprising a processor to perform operations. The operations may include determining respective distance data for a set of objects in a stereoscopic image captured based on a determined view area. The distance data may be based on respective distances between a reference point and the set of objects. The operations may also include generating a monocular image based on the stereoscopic image. The monocular image may include the set of objects and the distance data. The operations may also include rendering the monocular image in a display. The monocular image simulates spatial relationships between objects of the set of objects.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

DETAILED DESCRIPTION

Overview

Figure 1:
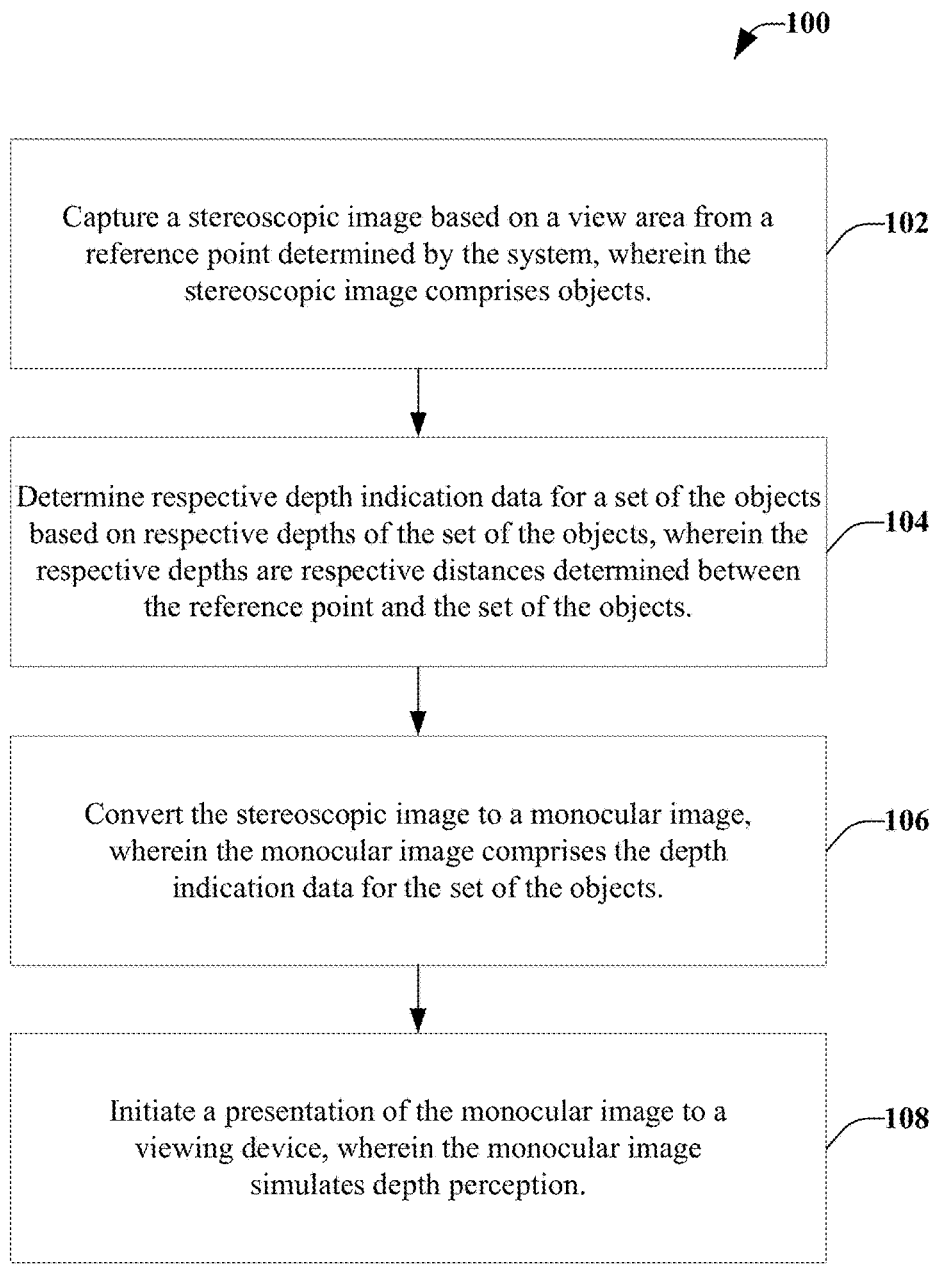
FIG. 1 illustrates an example, non-limiting embodiment of a method to create and present a monocular image to a viewing device.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, may be arranged, substituted, combined, separated, and designed in a wide variety of different configurations, all of which are explicitly contemplated herein.

In order to experience depth perception, the brain combines an assortment of binocular and monocular visual cues. Some binocular visual cues include disparity, eye convergence, and stereopsis. Additionally, some monocular cues include, size, visual angles, and motion parallax. When the brain combines and analyzes such cues, depth perception may be achieved.

The mammalian eyeball is a biological camera. Out of a 180 degree human field of vision, both eyes together gather information typically from within the centermost 120 degrees of the visual field that is referred to as binocular vision. The remaining 30 degrees on either side of this 120 degree field is referred to as peripheral vision and is perceived through monocular vision since the other eye cannot see across the nose to the other side of the face.

Within the 120 degrees in the center of the visual field, the brain uses the aforementioned clues to determine the depth of objects in its environment. Due to the nature of human eyes and their function, in the event of a defect to an eye, it may be possible to correct one's vision using external cameras in place of the defective biological camera, which is the eye. However, if a brain lesion prevents the individual from seeing, or nerve or other damage is present, the vision defect might not be curable. Similarly, certain eye damage and conditions are not currently amenable to treatment in all patients.

Modern medical procedures currently do not allow for full eye transplants and, therefore, corneal transplants are performed. These procedures are expensive, the cost of this procedure may be about $7,500 USD to around $11,000 USD. In contrast, the cost of implementing the various aspects discussed herein are relatively inexpensive when compared to the price of the transplant procedure. Furthermore, many patients with corneal damage are not candidates for corneal transplant. For example, patients who suffer corneal damage as a result of ocular herpes are considered poor candidates for corneal transplant, as the trauma of the transplant presents a high risk for triggering a new disease outbreak.

Some humans never develop binocular vision, and some never develop the brain processing pathways necessary to process binocular depth data. Such may be the case, for example, where a baby is born with strabismus that is sufficiently severe. In this case, the brain may be unable to utilize both use eyes in concert during the period during which brain plasticity makes development of binocular vision possible. Although it should be noted that certain newer studies indicate that certain sequelae of strabismus may be corrected, with work, well beyond the two to five year age at which it was once thought that sequelae of strabismus were effectively permanent.

In addition to the ability to restore or provide depth perception and stereopsis through the use of the various aspects disclosed herein, the various aspects may furthermore improve vision with augmented reality overlays that were never available to them innately. Furthermore, depth and movement information not available to those with even the most perfect vision may have substantial safety, functional, entertainment or other utility, and perception of that additional data is a substantial improvement over existing vision. For example, different wavelengths of light can be overlaid over light perceived by the user. In one example, far infrared light can be overlaid over visible spectrum images to provide detail and/or information not currently available to a biological eye. The detail and/or information can be visual detail and/or visual information. However, the detail and/or information need not be visual. For example, sources of sounds can be indicated (e.g., sound sources can glow), sources of radio frequency radiation can be indicated (e.g., to allow an electrician to visually perceive which wires are associated with electrical current, etc.), other information can be indicated, etc.

As provided herein, various aspects relate to visualization of spatial and other relationships. The disclosed aspects allow visually impaired users to see with depth perception by correcting, enhancing, or otherwise providing binocular visual input resulting in stereopsis (e.g., perception of depth and three-dimensional structures). By using a camera system, the disclosed aspects may provide the user with visual information sufficient to enable stereopsis.

In one aspect disclosed herein, the visual information provided may be the appropriate monocular view to complement the view of the perfectly (or adequately) functionally eye. In another aspect disclosed herein, the visual information provided may be an augmented reality (AR) overlay that shows the visually impaired individual both static distances and the change in distances between objects, calculated in real time, as the visually impaired individual interacts with her current environment. Yet another aspect disclosed herein formats a processed stream of visual data to present binocular images to a single eye in a manner that simulates stereopsis. In a non-limiting implementation, additional data can be projected against a partially reflective windowed surface, such as a front window of a car. Such projection may optionally be coupled with a device to visualize location of a user's eyes and/or location of the projected images adjusted appropriately so that data related to particular objects are overlaid over (or displayed relative to) the particular objects. In another non-limiting implementation, projection of additional data can be generated using polarized light that is filtered out by glasses worn by a passenger in a car (or that is attenuated by glasses worn by a driver of the car). A surface (e.g., a windshield, another surface, etc.) can also be designed with tiny louvers or ripples that are positioned relative to a projection source in a manner that directs at least a portion of projected light toward a primary user, thus limiting an amount of projected light toward at least one secondary user.

The term "visual impairment" as utilized herein may refer to a physical defect or handicap. Further, as used herein "visual impairment" may also refer to voluntary impairment, such as where a user utilizes technology that provides a data feed to just one eye. Such technology may include gaming devices, or other monocular devices (e.g., a spotting scope, night vision goggles, and so on).

It should be appreciated that artificially generated images, such as ones projected or overlaid over a scene, can be made to hold different focal characteristics and/or other characteristics. For example, a person may suffer from halos around lights, particularly around point sources. In such a case, it may be desirable to reduce an amount of light transmitted by the point sources. One specific type of impairment is laser eye surgery, or a similar procedure, that corrects one eye for distance vision and another eye for reading. In such a case, there may be a partial impairment to binocular vision that may benefit from correction utilizing aspects of the disclosure described herein.

It should also be appreciated that certain vision tasks, such as reading, can be better accomplished utilizing non-traditional color or shading. For example, reading often causes less eye fatigue for a user if the user is reading white lettering against a black surface. However, for historical reasons relating to development of the printing press, and relative cost of dark ink vs. white ink and black paper vs. white paper, nearly all printed materials are presented as black letters on a light colored or white surface. Therefore, aspects of the disclosure described herein may reverse colors of visual areas, in real-time, in order to accommodate visual needs or preferences of a user. For example, with respect to the reading example described above, boundaries of a book may be identified. Furthermore, dark colors and light colors can be reversed within the identified boundaries.

It should be appreciated that reference herein to capturing data in stereoscopic images may also include capturing depth data using a monocular image combined with other measures of measuring depth, such as those described in U.S. Pat. No. 8,593,565 issued to one of the instant inventors, Gary Shuster, and incorporated by reference in its entirety herein.

Visualization of Spatial and Other Relationships

With respect to one or more non-limiting ways to provide visualization of spatial and other relationships, FIG. 1 illustrates an example, non-limiting embodiment of a method 100 to create and present a monocular image to a viewing device. The method 100 in FIG. 1 may be implemented using, for example, any of the systems, such as a system 200 (of FIG. 2), described herein below.

Beginning at block 102, capture a stereoscopic image based on a view area from a reference point determined by the system. The stereoscopic image may comprise objects. The term "object" is used herein to refer to anything that may be perceived by a human eye, a camera, and the like. Although "object" usually refers to something that is inanimate (e.g., a book, a chair, a tractor, and so on), as used herein an "object" may also refer to something that is living (e.g., a person, an animal, a tree, and so on) or to a condition within a visual field that is not usually amenable to visual light perception (e.g., clear air turbulence as seen from a cockpit, source of noise accompanying a leak in a hot air balloon, and so on).

Further, the view area may be determined based on a wearable device, which may be a standalone wearable device, such as glasses, contact lenses or goggles, for example. The view area may be inferred based on a direction a user (e.g., person, animal) wearing the device is facing, a line of sight of the devices (e.g., a line of sight of each lens of a pair of glasses, a viewing range of a camera, and so on) and/or a determined viewing direction of pupils of a user. Block 102 may be followed by block 104.

At block 104, determine respective depth indication data for a set of the objects based on respective depths of the set of the objects. The respective depths may be respective distances determined between the reference point and the set of the objects. For example, the reference point may be the location of the user and the respective depths may be the distances between the user and each of the objects.

In another example, the reference point may be an anticipated location of the user in a set amount of time. In a situation where the user is sitting, looking out a window, the anticipated location of the user may be the current location. In another situation, the user may be walking and the anticipated location may be calculated based on a current speed and direction. Thus, the respective distances between the user and the object(s) might be adjusted based on whether the user is moving away from, or moving toward, the object(s). Further, if the user is driving a car, the speed and direction of the user will be different than if the user is walking. Block 104 may be followed by block 106.

At block 106, convert the stereoscopic image to a monocular image. The monocular image may comprise the depth indication data for the set of objects. For example, to convert the stereoscopic image to the monocular image, lines may be drawn at different virtual depths and relative to the object(s) to aid in depth perception. According to an implementation, the lines may be a set of lines, lines having different colors, sets of lines having different colors, lines having different patterns, sets of lines having different patterns a grid, grids, and so on.

In another example, converting the stereoscopic image to the monocular image may include artificially moving the object(s) relative to one or more other objects. Thus, in the real world, a first object has a position "X", but in the monocular view, the first object's position has been adjusted to "X+Y" (or "X−Z") to avoid a potential occlusion of objects, or to demonstrate relative distances between objects, where X, Y, and Z are integers.

Other examples of converting the stereoscopic image to the monocular image may include altering a focus point of one or more objects, altering a darkness of an object. Still another example may include extending a series of lines from a perimeter of an object. A further example may include creating respective transparent images of one or more objects, where the respective transparent images are overlaid on the respective image and the transparent images indicate depth perception. For example, if a first object is closer to the reference point than a second object, the transparent image of the first object may be larger relative to the first object than the sizing of the transparent image of the second object. Further details related to converting the stereoscopic image to the monocular image will be provided below. Block 106 may be followed by block 108.

At block 108, initiate a presentation of the monocular image to a viewing device. The monocular image simulates depth perception. For example, the presentation may be initiated on the wearable device (e.g., a pair of glasses) or on a non-wearable device (e.g., a windshield in a vehicle). In another example, the presentation may be initiated on one or more displays that are located near the user (e.g., a computing device). In a further example, the presentation may be initiated on one or more displays that may be perceived by the user and/or one or more other users. Further, the presentation may be initiated by multicasting the presentation to one or more devices.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
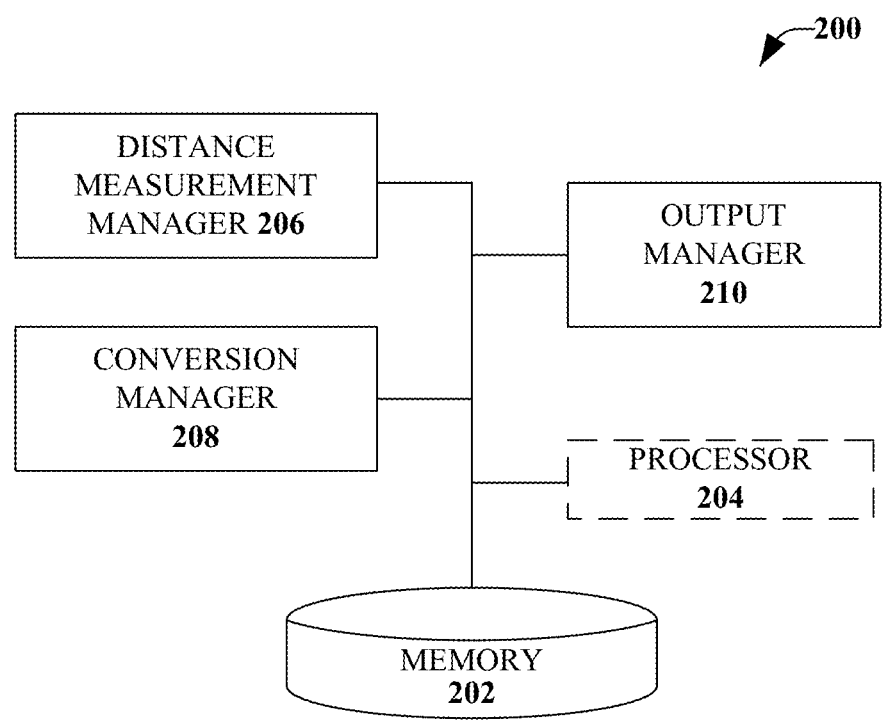
FIG. 2 illustrates an example, non-limiting embodiment of a system to improve visualization of spatial relationships and other relationships.

FIG. 2 illustrates an example, non-limiting embodiment of the system 200 to improve visualization of spatial relationships and other relationships. The system 200 may be configured to utilize a variety of mechanisms to provide the benefits of stereopsis to those with vision problems, to singe-eye displays, and to environmental elements that may be too distant or otherwise not good subjects for biologically natural stereoscopic vision.

The system 200 may include at least one memory 202 that may store computer-executable components and instructions. The system 200 may also include at least one processor 204, communicatively coupled to the at least one memory 202. Coupling may include various communications including, but not limited to, direct communications, indirect communications, wired communications, and/or wireless communications. The at least one processor 204 may be operable to execute or facilitate execution of one or more of the computer-executable components stored in the memory 202. The processor 204 may be directly involved in the execution of the computer-executable component(s), according to an aspect. Additionally or alternatively, the processor 204 may be indirectly involved in the execution of the computer executable component(s). For example, the processor 204 may direct one or more components to perform the operations.

It is noted that although one or more computer-executable components may be described herein and illustrated as components separate from the memory 202 (e.g., operatively connected to memory), in accordance with various embodiments, the one or more computer-executable components might be stored in the memory 202. Further, while various components have been illustrated as separate components, it will be appreciated that multiple components may be implemented as a single component, or a single component may be implemented as multiple components, without departing from example embodiments.

A distance measurement manager 206 may be configured to determine distance data. The distance data may comprise respective distances for a set of objects in stereoscopic data representing a stereoscopic view located within an area of view. The area of view may be determined from a reference point that is determined by the system 200. For example, the distance measurement manager 206 may determine the distance data based on respective distances between a user and a set of objects and the area of view may be a viewing range of the user, as determined by the system 200.

A conversion manager 208 may be configured to transform the stereoscopic data to monocular data that represents a monocular view. The monocular view may comprise indications of the respective distances determined by the distance measurement manager 206. An output manager 210 may be configured to convey the monocular data to a display. The monocular view of the monocular data may facilitate simulation of depth perception of the set of objects on the display. According to one implementation, the output manager 210 may be configured to initiate display of the monocular view on a heads up display during operation of a vehicle associated with the heads up display, for example.

The various aspects disclosed herein may be implemented as a standalone wearable device or may be implemented in conjunction with a wearable display (e.g., Google Glass™, or other devices). The standalone device may be utilized by the output manager 210 to initiate a two display (or more display) or a single display wearable device where the single available display rests in line of sight of the impaired eye. A two display implementation may aid those users with two impaired eyes. A single display version may allow users with only one impaired eye to choose the eye to receive the assistance of the system 200. The installation of the system 200 on wearable displays (for example, those available to consumers for purchase) may, in one aspect, use the display's onboard hardware to provide the visually impaired with the most complete visual assistance possible, given the limitations of the purchased display's hardware, if any. In one aspect, specialized hardware, processing, network or distributed computing, in-camera processing or other dedicated hardware may be utilized alone or in conjunction with onboard hardware.

In certain cases, the display may be sufficiently distant from the user such that multiple users may view the display. In some cases, the data streamed to the device may originate from another user or device, may be simulated or wholly artificially generated, may be multicast to multiple devices at once, and so on. In a non-limiting implementation, multiple devices may be configured as a network and/or a device in the network may use data from other devices to improve imaging. In a non-limiting example, where vehicles are equipped with a device (e.g., device associated with a windshield-projection vision enhancement system), cameras on a first vehicle may not be able to identify whether a second vehicle a certain distance (e.g., 50 yards) in front of the first vehicle is slowing down (e.g., the first vehicle may be too distant, the first vehicle have a wrong point of view, a cameras of the first vehicle may be obstructed, etc.). However, a third vehicle, which may be directly next to the second vehicle, may be able to obtain necessary data for the first vehicle and may be able to share the necessary data with the first vehicle (e.g., so that a device of the first vehicle can project a warning signal, etc.). It should be appreciated that these descriptions (and other descriptions and examples herein) are not to be interpreted as limiting. By providing various examples, it is not meant to exclude combinations and variations of the aspects described herein.

As an example, the disclosed aspects may be constructed with a frame that holds one or two transparent displays and is supported by the bridge of the user's nose and back of the user's ears. In one aspect, the device may be outfitted with two, two-dimensional (2D), stereoscopic, or three-dimensional (3D) depth sensing cameras. These cameras may be mounted on, or embedded in the device in such a way as to accurately gather stereo visual input. Other imaging mechanisms may also be utilized, such as a light field cameras (such as the Lytro™), artificially generated images, images generated from or incorporating radar, forward looking infrared, images constructed from sonar information, images constructed from magnetic resonance information, or other data, images generated by analysis, synthesis or combination of images originating on one or more devices separate from the display device, or incorporated with the display device.

The device may be connected to other devices such as, but not limited to, smartphones notebooks or computer networks via Bluetooth, WiFi, Near Field Communication (NFC), Long Term Evolution (LTE), infrared, or other wireless protocols. Such connections may be to devices that may provide database information and/or that may assist the various aspects disclosed herein with computationally intensive tasks, such as real time calculation of change in distance between objects. In these cases, the disclosed aspects may utilize the processor(s) of the device(s) to which it is networked or paired. For example, the disclosed aspects may use the onboard processor to compute the change in distance between the objects closest to the user while other calculations, such as computing or determining distances further away from the user, may be pushed to the processors of coupled devices to alleviate the workload of the onboard processor and memory.

Additionally, the network and paired devices may be utilized for their access to object identification data. For instance, the disclosed aspects may be able to connect to a database of objects through the Internet for example, to provide the system with a larger sample from which to pull comparative object examples in order to make more accurate identifications. Such improvements may result in an improvement of identification from "a tree 50 meters away" to "a cedar tree 50 meters away." This type of differentiation between objects may also aid users who are near sighted, far sighted, have some astigmatism or other malady that prevents the user from identifying objects at different distances. Furthermore, this type of object identification coupled with real time distance calculations may assist users in navigating the environment where he or she may be currently located. Additionally, triangulation, a Global Positioning System (GPS), or other navigation or location data may be utilized. In an aspect, a combination of GPS data or similar location data, real world imaging data (e.g., satellite images, street-level images, etc.) and/or ambient data may be utilized to further enhance data available for processing in a particular scene. For example, it may be difficult to determine color of a house on a dark street, but location of the house combined with data from a street-level image or satellite image may allow the color of the house to be determined and/or presented to a user.

In an instance in which the user has one impaired eye and one fully (or adequately) functioning eye, the system 200 may be configured such that a display rests in front of the impaired eye. While in front of the impaired eye, the system 200 may display the appropriate image to allow stereopsis. The appropriate image may be an image that is the complement to the image seen by the unimpaired eye, such that the proper image disparity is created for the visual cortex (in the brain) to analyze, to allow the user to perceive depth, and so on.

In another aspect, where a user has a differential in visual acuity between the eyes such that the brain does not properly perceive depth, the user may actuate a switch, for example, to change a view. For example, the switch or other type of activation can be utilized to degrade the image arriving at the less impaired eye's retina (or otherwise make more equal the images arriving at each retina) so that the differential in the images is reduced enough to permit stereopsis. Such actuation may be achieved manually, automatically, by verbal command, constantly, intermittently, by a computer based on analysis of the task being performed, and so on.

In another aspect, a video stream may be presented to a single eye. The video stream may include alternating frames (or alternating sequences of frames) that are from the perspective of a binocular set of cameras or that are similar to the binocular vision that would normally be received by two eyes.

For purposes of explaining the disclosed aspects, and not by way of limitation, an example of an N frames per second display, wherein X frames are displayed from a perspective consistent with the left eye position (referred to as L frames). Further, Y frames are displayed from a perspective consistent with the right eye position (referred to as R frames). In one implementation, X and Y are equal (or nearly equal) and may consist of a single frame, multiple sequential identical frames, or multiple sequential different frames. The L frames and the R frames may alternate, but are displayed to a single eye. According to other implementations, the L frames and R frames may alternate, but are displayed simultaneously to both eyes, on a distant monitor, and so on.

According to another implementation, a natural object (e.g., an object having a physical presence in the real world) or an artificial object (e.g., an object that does not exist or does not have a physical presence in the real world) may be placed in the field to provide one or more reference points. The artificial object may be desirable for scenes featuring only, or primarily, distant objects.

By composing the L frames and the R frames so that the frames are composed as if viewed by the left eye or the right eye respectively, the viewer is presented with a data stream that is similar to the data stream they would obtain from both eyes. However, the data stream is received by one eye only (e.g., the functioning eye).

In accordance with some aspects, the system 200 may be trainable to vary the frames per second, or the number of sequential L frames and R frames, whether sequential L frames are identical, or nearly identical, or vary, and whether sequential R frames are identical, nearly identical, or vary.

Figure 3:
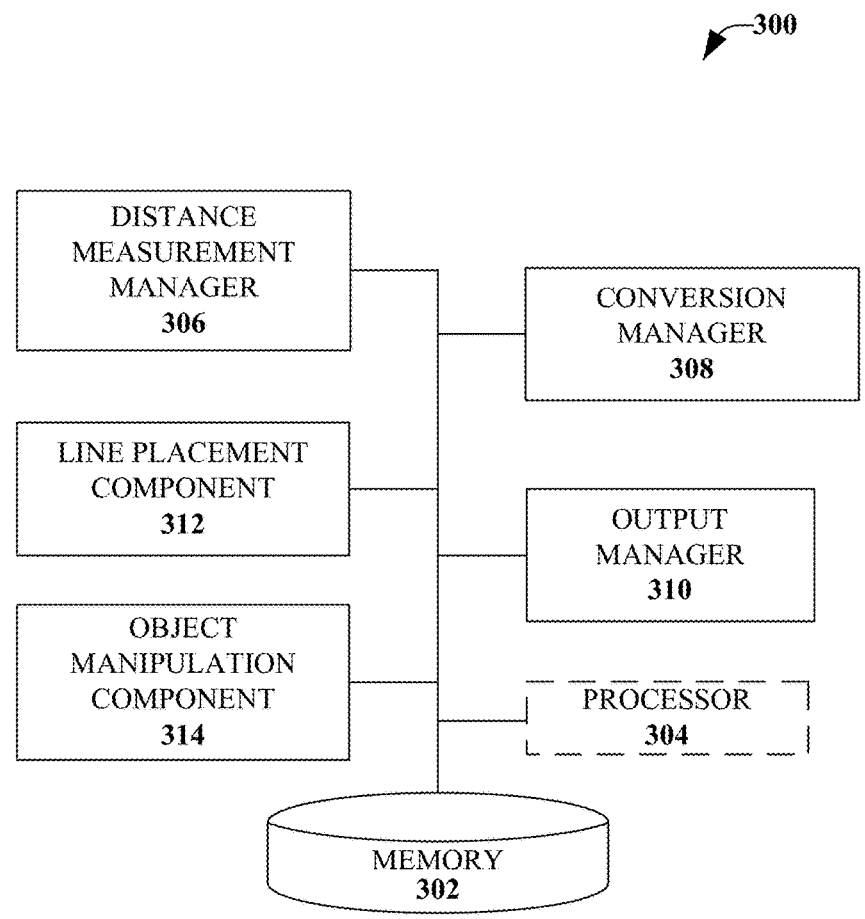
FIG. 3 illustrates another example, non-limiting embodiment of a system to provide visualization of spatial relationships.

FIG. 3 illustrates another example, non-limiting embodiment of a system 300 to provide visualization of spatial relationships. The human brain may attempt to make received data useful, even when the data is received in a novel or unexpected manner. Thus, the human brain may process the varying L frames and R frames, as discussed above, as if the frames are actually received by the left eye or right eye, and may perceive depth in many cases. However, there may be situations, such as where depth perception was never learned during the period when brain plasticity was sufficient to learn depth perception, where the brain may not be able to simulate depth perception using alternating frames because the brain is incapable of depth perception even with proper vision in both eyes. Therefore, in addition to, or in place of, outputting alternating L frames and R frames, the system 300 may be configured to present one or more artificial elements within a monocular image.

System 300 may include at least one memory 302 that may store computer-executable components and instructions. The system 300 may also include at least one processor 304, communicatively coupled to the at least one memory 302. The at least one processor 304 may be operable to execute or facilitate execution of one or more of the computer-executable components stored in the memory 302.

As illustrated, a distance measurement manager 306 may be configured to determine distance data comprising respective distances for a set of objects. For example, the set of objects may be in stereoscopic data representing a stereoscopic view located within an area of view determined from a reference point determined by the system 300. Further, a conversion manager 308 may be configured to transform the stereoscopic data to monocular data that represents a monocular view that comprises indications of the respective distances.

An output manager 310 may be configured to convey the modular data, to a display. According to one implementation, the artificial elements may be rendered by the output manager 310 in a manner where the artificial elements appear as natural parts of the environment. In another implementation, the artificial elements may be presented by the output manager 310 in a manner that relates to a proximity to the user. It should be appreciated that artificial elements may be presented in the environment even though the artificial elements may not normally be included in the environment (e.g., elements that may never be present in a normal environment may be presented). For example, letters with the word "Stop" may be generated to appear as floating letters next to a red light. While floating letters are never part of a natural environment, the floating letters may be presented in a manner that integrates the floating letters into the natural environment in a manner that appears seamless or natural to an observer. For example, size of the floating letters can be varied with respect to distance of an observer to the red light, saturation of the floating letters can be varied to match nearby environmental elements, contrast of the floating letters can be varied to match nearby environmental elements, and intensity of the floating letters can be varied to match nearby environmental elements, artificial shadows can be generated for the floating letters, shading of the floating letters can be varied (e.g., shading of the floating letters can be varied relative to light sources in an environment), etc.

A line placement component 312 may be configured to present one or more artificial elements, such as a grid, vertical lines, or horizontal lines in the monocular view, which may be used in place of (or in addition to) alternating the set of L frames and R frames. Further, the line placement component 312 may be configured to arrange a set of vertical lines and a set of horizontal lines within the monocular view of the monocular data. For example, the set of vertical lines may represent a first distance from the reference point and the set of horizontal lines may represent a second distance from the reference point.

In a specific example, a grid composed of several vertical and several horizontal lines may be overlaid and calibrated as representing a set or variable distance from the user. In one aspect, the user may set this distance based on a user preference. In another aspect, the system 300 may set this distance or the rules (in the case of a variable distance grid) for changing distance(s). The user, or the system 300, may set the rules for changing grid appearance with changing distance(s), such as by thickening lines that represent closer distances. In some implementations, more than one artificial element may be presented with each element representing a respective distance from the user.

An object manipulation component 314 may be configured to interpose the set of objects relative to the set of vertical lines and the set of horizontal lines based on the respective distances from the reference point for the set of objects, as determined by the distance measurement manager 306.

Figure 4:
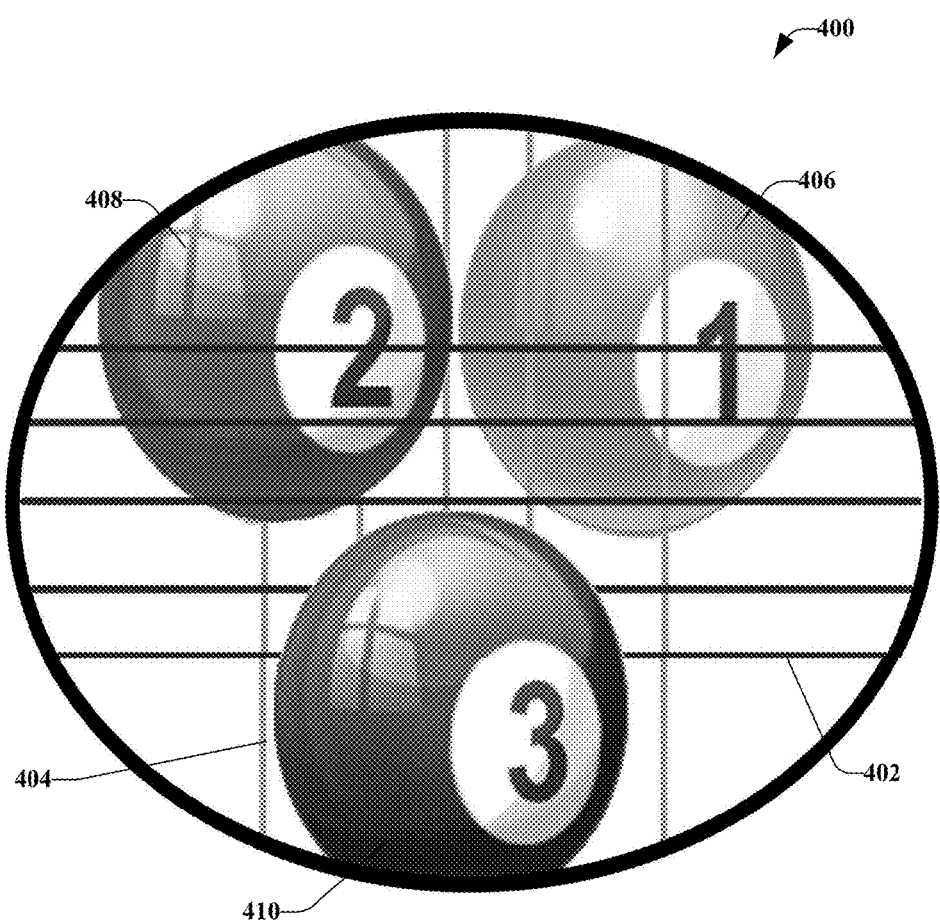
FIG. 4 illustrates an example, non-limiting representation of a monocular view that includes objects and artificial elements placed in a monocular view.

By way of example and not limitation, FIG. 4 illustrates an example, non-limiting representation of a monocular view 400 that includes objects and artificial elements placed in a monocular view. The artificial elements in this example include a set of horizontal grid lines 402 and a set of vertical grid lines 404. Although the set of horizontal grid lines 402 and the set of vertical grid lines 404 comprise five lines each, the disclosed aspects are not limited to this implementation and fewer or more lines may be utilized to represent the distances. Further, the set of horizontal grid lines 402 and the set of vertical grid lines 404 may comprise a same number of lines, as illustrated, or each may comprise a different number of lines. Further, although discussed as lines having a particular color, the disclosed aspects are not limited to this color scheme. Further, lines in any given implementation may differ from each other and/or from other implementations. For example, width of lines may differ, contrast of lines may differ with respect to other environmental elements, color of lines may differ, segmentation of lines may differ (e.g., a line may be a dotted line, a line may be a dashed line, etc.), weight of lines may differ, texture of lines may differ and/or other elements of lines may differ.

According to a specific example, the set of horizontal grid lines 402 may represent a distance of ten feet from the user and the set of vertical grid lines 404 may represent a distance of twenty feet from the user.

A set of three billiard balls, labeled as a first ball 406, a second ball 408, and a third ball 410, are interposed between the set of horizontal grid lines 402 and the set of vertical grid lines 404. For example, the set of horizontal grid lines 402 and the set of vertical grid lines 404 are placed in the monocular view in order to appear to be placed behind the third ball 410. Thus, the third ball 410 obstructs of a view of the set of horizontal grid lines 402 and the set of vertical grid lines 404 at the location of the third ball 410.

Further, the set of horizontal grid lines 402 are placed in the monocular view over the second ball 408. The set of vertical grid lines 404 are placed in the monocular view in order to appear to be placed behind the second ball 408. Thus, the second ball 408 appears to be between the set of horizontal grid lines 402 and the set of vertical grid lines 404. In addition, the set of horizontal grid lines 402 and the set of vertical grid lines 404 are placed over the first ball 406.

Thus, with monocular vision only, it is apparent that the third ball 410 is closer than ten feet; the second ball 408 is closer than twenty feet, but further away than ten feet; and the first ball 406 is further away than twenty feet. Further, even if the grid lines are generated automatically and the user is informed or told of their distance via a heads-up display, for example, an audio system, or other means (or even without being told at all), the user may readily be able to determine that the third ball 410 is the closest; the second ball 408 is between the first ball 406 and the third ball 410; and the first ball 406 is the furthest away.

In an aspect, sound may be utilized to indicate distance and/or direction of movement. Utilization of sound to indicate distance and/or direction of movement can be employed alone or in combination with one or more other aspects described herein. In another aspect, a camera or other measuring device may determine an object that a user is looking at. In one implementation, an artificially generator indicator, such as a red "X", may be overlaid on an element that a user is determined to be looking at. In certain implementations, if an object is moving relative to a user, an artificial sound may be generated with an emulated Doppler effect, with sound pitch rising as the object approaches (e.g., rising with respect to speed of the object), or with sound pitch dropping as the object moves away from the user. In another implementation, there may be a sound (e.g., a constant sound) that is generated for a certain time interval after a user looks at a new object (e.g., for first N milliseconds that a user looks at a new object, etc.). As the gaze of a user is determined to move from a distant object to a closer object, sound may increase in volume and/or change in pitch. Pitch changes may, in one implementation, be similar to Doppler changes. Lateral movement relative to a user may be represented by changes to stereophonic balance.

Due to the nature of human data processing, in one aspect, it may be desirable to configure the artificial elements using different colors or patterns, but aligning the artificial elements in a similar matter (as opposed, for example, to having distance B being red horizontal lines and distance B being blue vertical lines). Similarly, the system 300, in some aspects, may alter the coloration, texture, width, pattern or other aspects of the artificial elements to make the artificial elements more readily distinguishable from the background.

According to some aspects, such as for users who are color blind, or in dark scenes where colors are not easily seen, or for users with issues seeing color, or for black and white transmissions, and so forth, in real time digital image processing, the colors may be converted to patterns. For example, blue might be a series of tiny chevrons, yellow might be little dots, red might be a series of tiny heart-shaped patterns, and so on. In accordance with some aspects, the conversion may be based on the manner in which newsprint photos are converted for printing. In another aspect, colors may be exaggerated, artificial color may be utilized and/or patterns may be varied (e.g., patterns may include flashing, patterns may be pulsed, etc.). Thus, "colors" may be shown in real time without actually using color (e.g., ambient color, other color, etc.). In certain implementations, color may be varied for situations where color is difficult to discern (e.g., for color-blindness situations, for low-light situations, etc.). In one example, a label "red" can be overlaid over a red traffic light for a color-blind person. In another example, red lights might be overlaid or replaced with pulsating lights in a display for a color-blind person (e.g., since it may be difficult to differentiate between a brake light and a reverse light, or to differentiate a turn signal, etc. for a color-blind person). Similarly, false color or enhanced color may be added to objects seen in low light and/or color saturation can be increased. In an aspect, colors may be overlaid on objects based on an object recognition search of a database of objects. For example, in a low-light situation where a sensing device cannot determine color of an object (e.g., a tree), the object can be identified (e.g., the object can be identified as a tree) and a database can be employed (e.g., database can be searched) to determine one or more colors for the object (e.g., how to colorize the tree).

Figure 5:
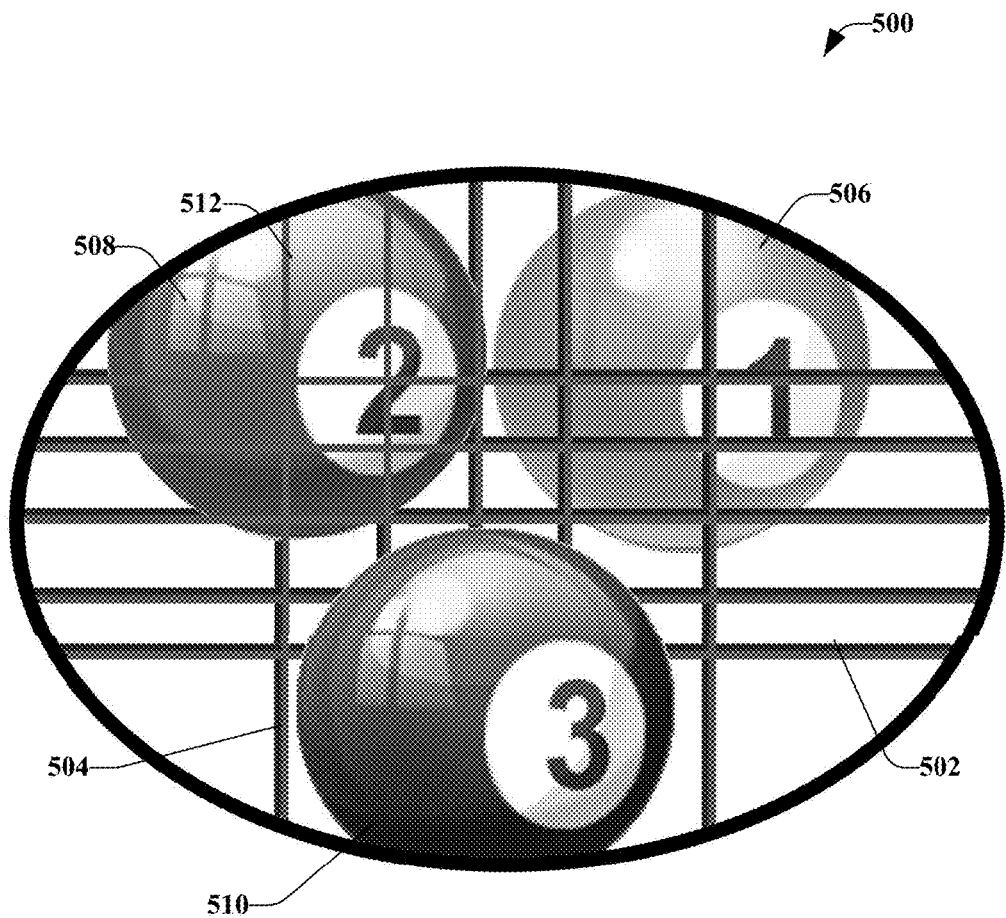
FIG. 5 illustrates an example, non-limiting representation of a monocular image that includes objects and artificial elements placed in a monocular view.

FIG. 5 illustrates an example, non-limiting representation of a monocular image 500 that includes objects and artificial elements placed in a monocular view. A set of horizontal lines 502 and a set of vertical lines 504 are placed in the monocular image 500. Also included in FIG. 5 are a set of billiard balls, illustrated as a first ball 506, a second ball 508, and a third ball 510.

Similar to FIG. 4, the third ball 510 is closest to the user (e.g., within ten feet), the second ball 508 is between ten feet and twenty feet away from the user, and the first ball 506 is further than twenty feet away from the user.

In FIG. 5, at least a portion of the set of vertical lines 504 are altered to appear as a separate set of lines 512 that appear different from the set of horizontal lines 502 and the set of vertical lines 504. For example, the set of horizontal lines 502 may be red, the set of vertical lines 504 may be blue, and the separate set of lines 512 may be green. This allows the separate set of lines 512 to be distinguished from an environmental object, such as the second ball 508, which may be blue in color. Thus, the viewer may more readily realize that the second ball 508 is between the first determined distance (e.g., ten feet) and the second determined distance (e.g., twenty feet).

As further illustrated in FIG. 5, a single, continuous, similar, or artificial element may have one or more features that change with distance. In FIG. 5, for example there is a single grid. However, the upper and left portions of the grid may be a first color and associated with a distance A and the lower and right portions of the grid lines may be a second color and associated with distance B, where B represents a distance closer to the user than distance A, for example.

In other embodiments, environmental elements may be artificially enlarged, given additional elements moved or otherwise manipulated to create overlay so that the closer element appears closer because the scene has been modified so that the closer element partially obscures the more distant element. Grid lines or other artificial elements may be used or may not be used in variations of this implementation. In accordance with another aspect, one of the artificial elements may be calibrated to appear behind objects closer than a set distance and in front of objects closer than a set distance. In another aspect, it may be desirable to utilize an environmental element or a location of significance in place of, in conjunction with, or in addition to, a set distance. For example, an artificial element (e.g., a red grid component) may be aligned with a position equal to the nearest intersection limit line when a driver (in a vehicle) is utilizing the system.

Figure 6:
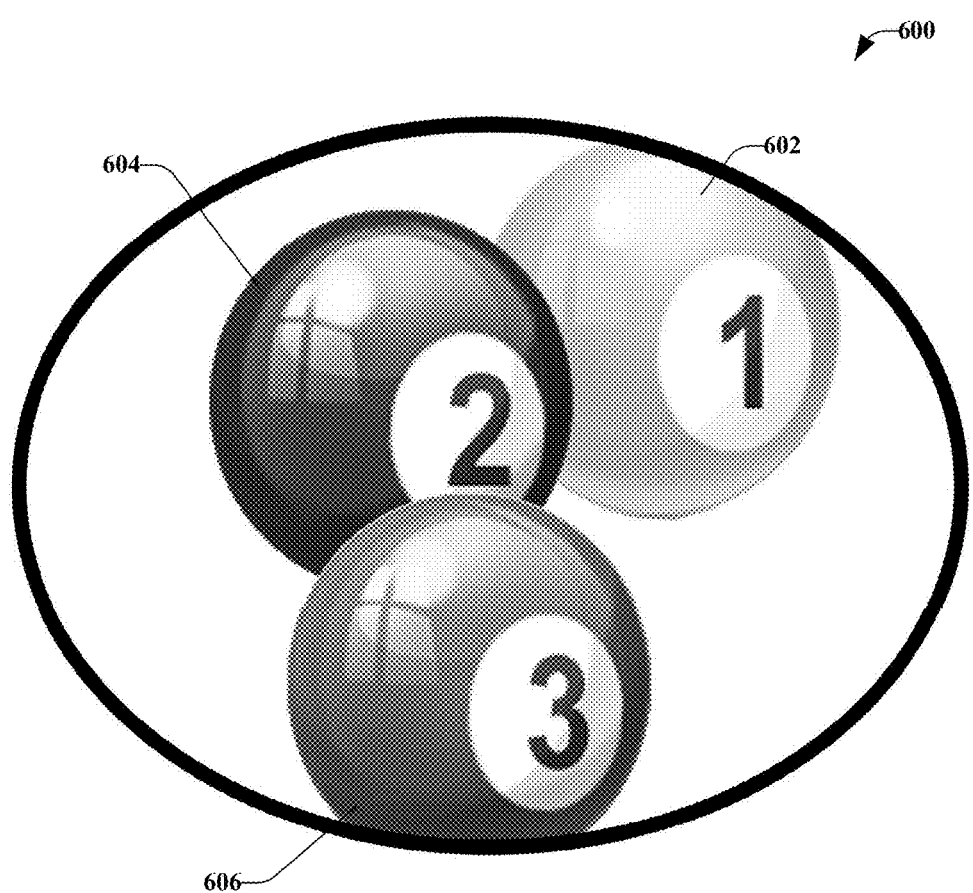
FIG. 6 illustrates an example, non-limiting representation of a monocular view that includes objects that are artificially moved in a monocular image.

FIG. 6 illustrates an example, non-limiting representation of a monocular view 600 that includes objects that are artificially moved in a monocular image. Illustrated are three billiard balls, labeled as a first ball 602, a second ball 604, and a third ball 606. As compared to the placement of the balls in FIG. 4 and FIG. 5, the second ball 604 has been artificially moved so that the second ball 604 lies between the first ball 602 and the third ball 606.

The object manipulation component 314 (of FIG. 3) may be configured to facilitate the artificial movement of one or more objects relative to one or more other objects. For example, in the real world, a first object has a position "X," such as the location of second ball 408 of FIG. 4, or second ball 508 of FIG. 5. Although, second ball 604 has the same physical location or position "X," in the monocular image, the second ball 604 has been adjusted to "X+Y" (or "X−Z") to demonstrate relative distances between objects, where X, Y, and Z are integers. Changes to size of objects and/or shape of objects may be desirable in certain implementations.

According to some aspects, the object manipulation component 314, or another system component, utilizes digital or other signal processing that interposes artificial elements, modifies existing objects, and/or in some other manner modifies the image (e.g., the monocular image) being presented to the user. Such manipulation provides additional cues as to depth, distance, and/or speed. In one aspect, this modification is performed in real time, or in near real-time.

According to some implementations presented herein, certain objects or primary devices may be configured to interact with the system 300. Such objects may include objects that contain Quick Response (QR) codes, specified colors, active signal transmitters, passive signal transmitters, cameras or other sensors that share data with the system 300. For example, a plurality of cameras and/or other sensors not located in the same place as the user may be utilized. Such cameras and/or other sensors may be able to provide triangulation, images, offset data speed data, location data, or other information.

In one aspect, the primary devices may communicate with each other. Such communication may be facilitated through a wide area network, a local area network an ad-hoc network, or other communication modality, and exchange data.

Image processing may be offloaded as necessary or desirable through a network or other connection to a cloud or distributed computing device or devices. Such data may be displayed to the user through a heads-up display, through a display reflected on glass or another transparent or largely transparent surface. Such surfaces include but are not limited to, an inner surface of a vehicle window. Further, the data may be displayed to the user through reflection on glasses, direct transmission to the optic nerve(s), an immersive display, such as the Occulus Rift, a wearable non-immersive display, such as Google Glass™, or another device.

Figure 7:
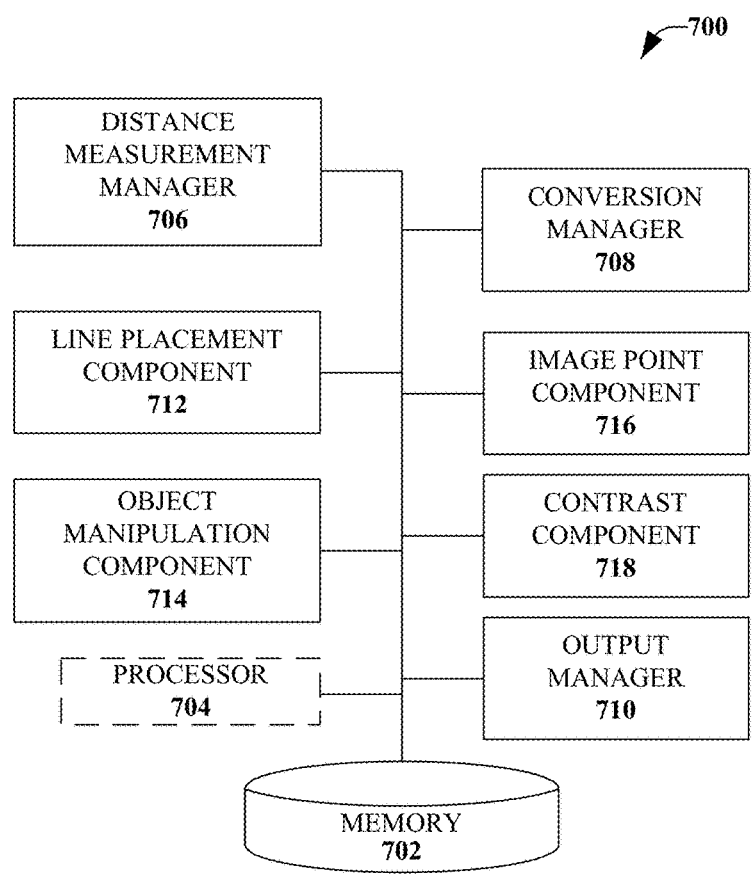
FIG. 7 illustrates a further example, non-limiting embodiment of a system to provide visualization of spatial relationships.

FIG. 7 illustrates a further example, non-limiting embodiment of a system 700 to provide visualization of spatial relationships. The system 700 may include at least one memory 702 that may store computer-executable components and instructions. The system 700 may also include at least one processor 704, communicatively coupled to the at least one memory 702. The at least one processor 704 may be operable to execute or facilitate execution of one or more of the computer-executable components stored in the memory 702.

A distance measurement manager 706 may be configured to determine distance data of objects in a stereoscopic image. For example, the distance data may include a first distance measured between a reference point, which may be a user or might be a different reference point, and a first object. The distance data may also include a second distance measured between the reference point and a second object. In addition, the distance data may include subsequent distances measured between the reference point and subsequent objects.

A conversion manager 708 may be configured to transform the stereoscopic image to a monocular view that includes the respective distance data determined by the distance measurement manager 706. An output manager 710 may be configured to convey the monocular data to a user or to a multitude of users. In an implementation, the output manager 710 may be configured to output the monocular view to at least one display.

Also including in the system 700 may be a line placement component 712 that may be configured to place one or more lines within the monocular view to simulate depth perception. Subsets of the one or more lines may have different properties including, but not limited to, different colors, different line thicknesses, different patterns, and so on. An object manipulation component 714 may be configured to interpose the objects between the lines as a function of the distance of each object from the reference point.

Alternatively or additionally, the system 700 may include an image point component 716 that may be configured to artificially (e.g., not apparent in the real-world view) alter the focus of various objects in order to provide more accurate, more apparent, and/or exaggerated distance data. Thus, the image point component 716 may be configured to alter a focus point of at least one object within the monocular image. For example, the focus point of the at least one object may be altered based on a distance determined for the at least one object and one or more other objects. The focus point may facilitate simulation of a spatial relationship between at least two objects of the set of objects in the display.

Figure 8:
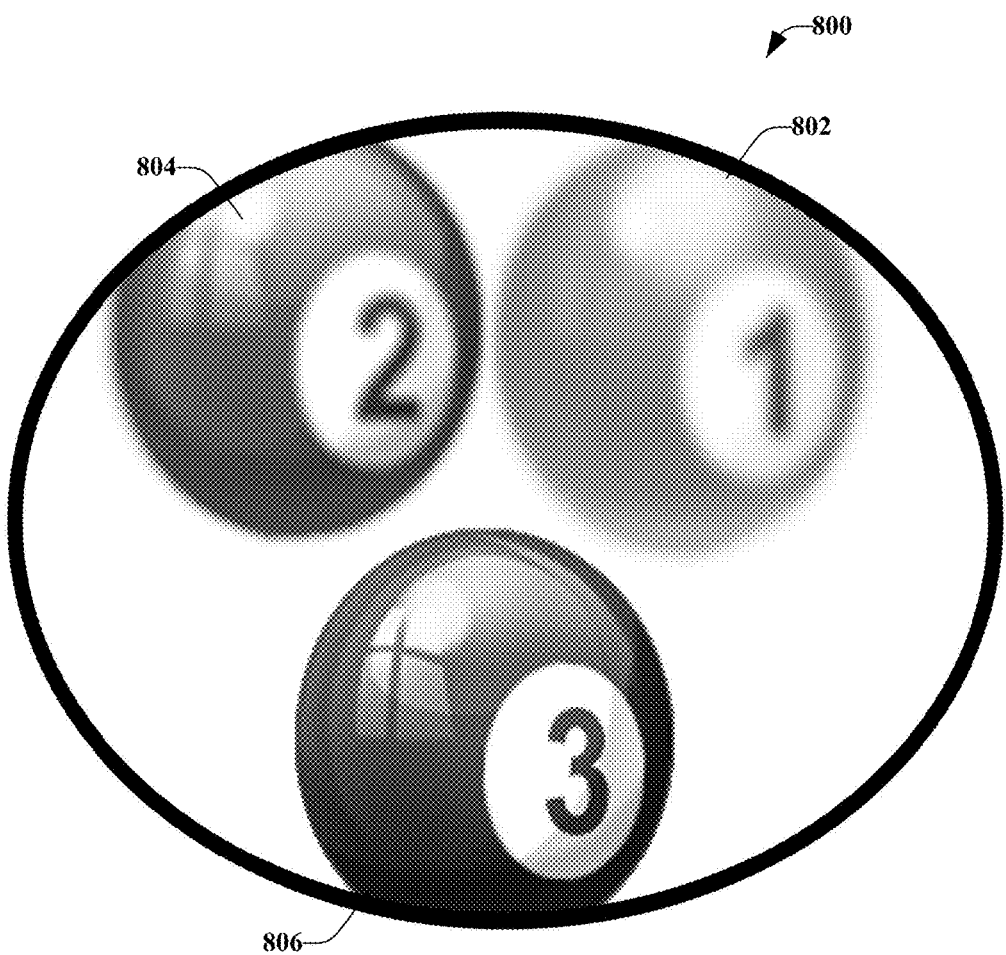
FIG. 8 illustrates an example, non-limiting representation of a monocular image that includes an object that has an altered focus point.

FIG. 8 illustrates an example, non-limiting representation of a monocular image 800 that includes an object that has an altered focus point. The monocular image 800 includes three billiard balls, labeled as a first object 802, a second object 804, and a third object 806. Although three billiard balls as used for illustration purposes, the disclosed aspects may be utilized with other objects, both animate and inanimate and more or fewer objects may be included. Further, the objects do not need to be of the same type (e.g., billiard balls) but may be different (e.g., a car, a person, a building, a cat, and so on).

As illustrated in FIG. 8, the third object 806 has a sharp focus, the second object 804 has a slightly blurry focus, and the first object 802 appears blurry. Thus, the spatial relationship between the object is apparent as a result of the changing focus point. Since the human eye does not modify focal depth for the purpose of determining the spatial relationship between objects, but the human brain does utilize focal depth for that purpose, it may be desirable in some aspects to present focal differences between objects to show their spatial relationship, where such focal differences are exaggerated when compared to that which would exist when viewed only with the human eye. Similarly, it may be desirable to correct exaggerated focal distances or focal distances that are different from that which the human eye would perceive with regard to images that are processed through optical and/or digital means.

For example, when an object that is 100 feet away is viewed through a 35 mm camera's viewfinder with a 400 mm lens at an aperture of F/8.0, the depth of field is such that objects between 95.7 feet and 104.7 feet will appear in focus, and thus functionally have a spatial relationship indistinguishable by reference to focus. Indeed, because humans may not distinguish focus perfectly, particularly in cases of low light, impaired vision, or similar conditions, objects even closer or further than 95.7 or 104.7 feet respectively may appear, by reference to focus only, to be equal or nearly equal in distance from the viewer. Where identification of relative distances is desired, such as when controlling a remote device (such as a bomb disarming robot or a remote controlled aircraft) or when manipulating a device (such as a pipette manipulating cells under a monocular microscope), it may be useful to artificially modify (e.g., digitally artificially modify, optically artificially modify, etc.) the relative focus to make the distance between objects more accurate, exaggerated, and/or more apparent.

With continuing reference to FIG. 7, additionally or alternatively, a contrast component 718 may be configured to alter respective brightness contrasts of at least two objects of the sets of objects within the monocular view on the display. The respective brightness contrasts may facilitate simulation of a spatial relationship between the at least two objects on the display.

Figure 9:
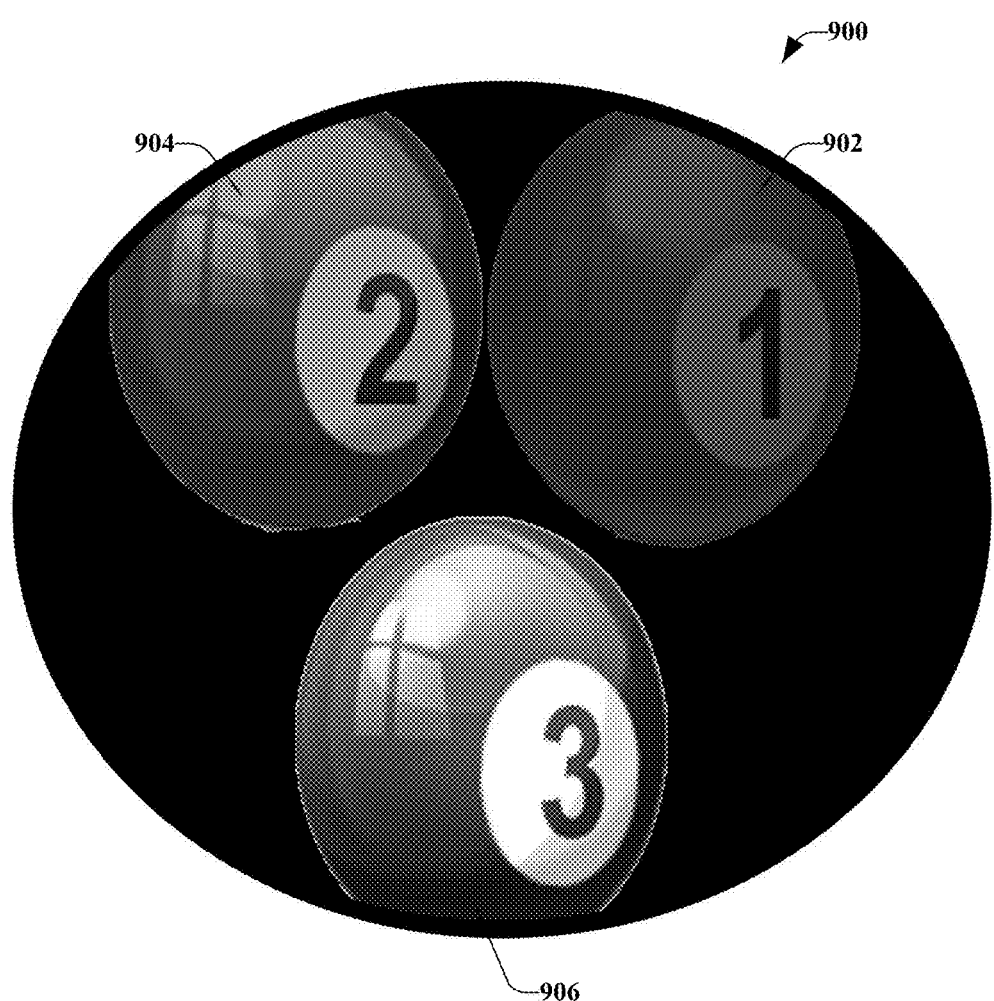
FIG. 9 illustrates an example, non-limiting representation of a monocular image that includes an object that uses brightness contrasts to simulate depth perception.

For example, in some instances, it may be desirable to artificially lighten or darken objects to indicate their spatial relationship to each other and/or to the user. As shown in FIG. 9, which illustrates an example, non-limiting representation of a monocular image 900 that includes an object that uses brightness contrasts to simulate depth perception, three objects (a first object 902, a second object 904, and a third object 906), may each be placed under a light of approximately equal lumens. In such a case, a user would not be able to use light falloff as a visual clue as to the spatial relationship of the objects to the user.

Thus, in one aspect, the contrast component 718 may artificially darken certain objects in order to indicate relative distance. In FIG. 9, the first object 902 is an object furthest away from the reference point and is darkened substantially by the contrast component 718. The second object 904 is an intermediate distance away from the reference point. Thus, the contrast component 718 moderately darkens the second object 904. Further, the third object 906 is the closest object to the reference point. Thus, the contrast component 718 may not darken the third object 906 or change its appearance. However, in some implementations, the third object 906 may be lightened or manipulated to provide a sharper image.

It may further be desirable to darken areas near or around, or at a similar distance to, the objects, in some aspects in a manner similar to the way the objects themselves are darkened. It should also be noted that "darkening" objects should be understood to include, in some implementations, making some objects lighter, whether or not other objects are darkened. Taking as a further example a visual field with the same three objects where the three objects are all illuminated in direct sunlight, this aspect may include darkening objects in a manner similar to a graduated camera lens filter, with the lighter elements of the filter applying to closer objects in the field and the darker applying to more distant objects.

In another aspect, one or more artificial light sources and/or one or more shading sources may be introduced into a scene in order to provide a reference point for shading of objects based on distance and/or to make shading of objects appear more natural. For example, at night it may be desirable to determine relative positions of a first object, a second object and a third object. If the only light source is moonlight, and the light source is positioned perpendicular to a line between ae viewer and the objects (e.g., the first object, the second object and the third object), the shading provided by the moon would not improve ability of a user to discern relative distances. Assuming that the first object is closest object and the third object is a most distant object, an artificial street light may be placed near the first object. Therefore, the first object can be artificially brightened by N lumens, the second object can be artificially brightened by N/2 lumens, and the third object can be artificially brightened by N/4 lumens. Additionally, a second artificial light of a different color, intensity and/or other characteristics may be placed in a second position (e.g., near the second object). If the second artificial light is red, red light may therefore be projected on the second object using N lumens, and on the first object and the second object using N/2 lumens.

Figure 10:
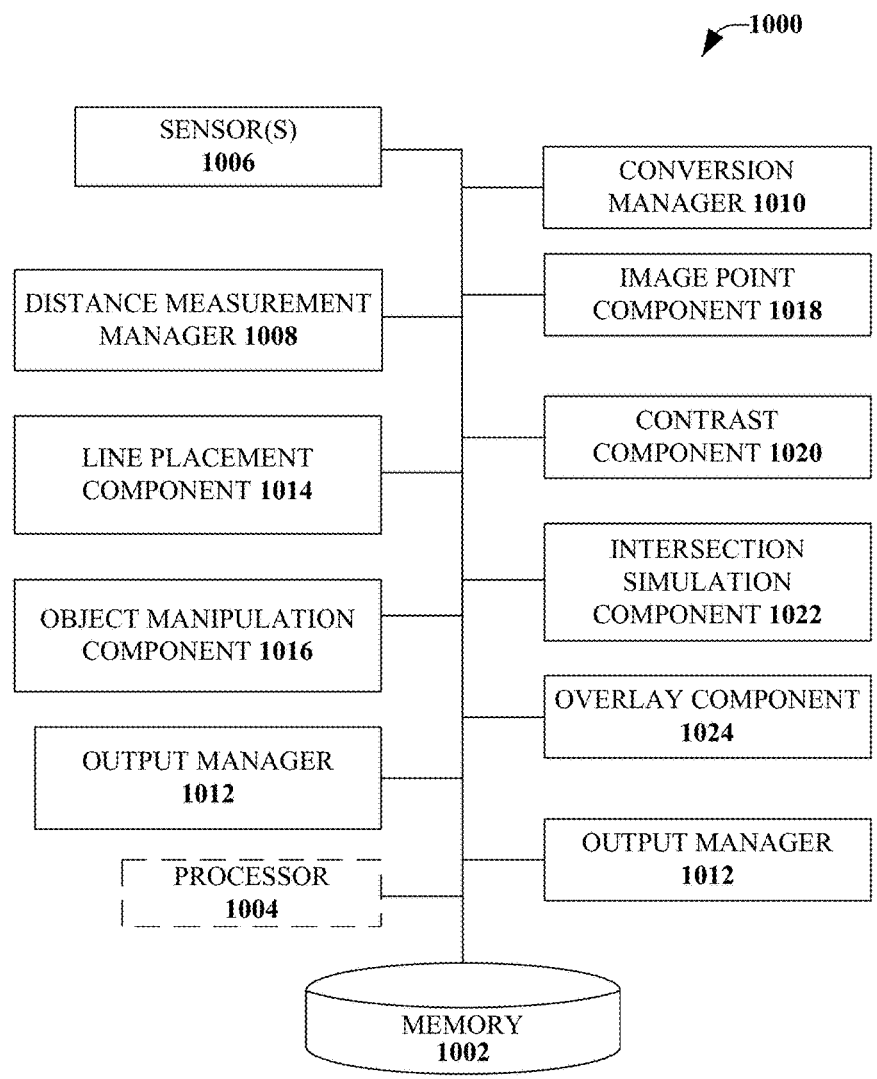
FIG. 10 illustrates an example, non-limiting embodiment of a system to alter one or more aspects associated with objects to simulate depth perception.

FIG. 10 illustrates an example, non-limiting embodiment of a system 1000 to alter one or more aspects associated with objects to simulate depth perception. The system 1000 may include at least one memory 1002 and at least one processor 1004, communicatively coupled to the at least one memory 1002. The memory 1002 may store computer-executable components and instructions. The at least one processor 1004 may be operable to execute or facilitate execution of one or more of the computer-executable components stored in the memory 1002.

A sensor(s) 1006 may be configured to capture a stereoscopic image based on a view area from a reference point determined by the system 1000. The stereoscopic image may include objects. According to some aspects, more than one sensor may be utilized. The sensor(s) 1006 may be one or more cameras, for example. Further, the sensor(s) 1006 may be located near the user or may be located remote from the user. For example, the sensor(s) or camera(s) may be able to provide triangulation, images, offset data speed data, location data, or other information.

A distance measurement manager 1008 may be configured to determine respective depth indication data for a set of the objects based on respective depths of the set of objects. The respective depths may be respective distances determined between the reference point and the set of the objects.

A conversion manager 1010 may be configured to convert the stereoscopic image to a monocular image that comprises the depth indication data for the set of the objects. Further, an output manager 1012 may be configured to initiate a presentation of the monocular image to a viewing device, wherein the monocular image simulates depth perception. For example, the output manager 1012 may be configured to initiate a display of the monocular image by a heads up display device. Further, the viewing device may be at least one of an eye, an eyeball object, glasses, a wearable device, a vehicle windshield, a display screen, direct neural input, an artificial retina, a contact lens, a laser or other light source projecting directly onto the retina, or other modality.

A line placement component 1014 may be configured to position a set of horizontal grid lines within the monocular image. Further, the line placement component 1014 may be configured to position a set of vertical grid lines within the monocular image. The set of horizontal grid lines may represent a first depth and the set of vertical grid lines may represent a second depth. Alternatively, the set of vertical grid lines may represent a first depth and the set of horizontal grid lines may represent a second depth. Further, an object manipulation component 1016 may be configured to interpose the set of objects among the set of horizontal gird lines and the set of vertical grid lines based on the respective depths.

According to an implementation, the line placement component 1014 may be configured to position a first set of lines of a first color and a second set of lines of a second color within the monocular image. The first color and the second color may be different colors. Further, the object manipulation component 1016 may be configured to interpose the set of the objects among the first set of lines and the second set of lines. A perceived color of the first set of lines and the second set of lines indicates depth perception.

For example, the object manipulation component 1016 may be configured to locate a first object of the set objects coincident with the first set of lines and the second set of lines based on a first determination that the first object is closer to the reference point than a first distance. The first object may obstruct a view of the first set of lines and the second set of lines in the monocular image.

The object manipulation component 1016 may be configured to locate a second object of the set of the objects between the first set of lines and the second set of lines. The placement of the second object may be based on a second determination that the second object is farther from the reference point than the first distance and closer than a second distance different from the first distance. A view of the second object may obstructed by the first set of lines and the first color in the monocular image.

Additionally, the object manipulation component 1016 may be configured to locate a third object of the set of the objects behind the first set of lines and the second set of lines. The placement of the third object may be based on a third determination that the third object is farther from the reference point than the second distance. The first set of lines and the second set of lines may overlap the third object in the monocular image.

According to some implementations, the distance measurement manager 1008 may be configured to determine a first object of the set of the objects is closer to the reference point than a second object of the set of the objects, and a third object of the set of the objects is farther from the reference point than the second object. Further, the object manipulation component 1016 may be configured to move the second object, wherein the second object is interposed between the first object and the third object in the monocular image.

In accordance with another implementation, an image point component 1018 may be configured to alter a focus point of an object of the set of the objects resulting in an altered focus point. The spatial relationships between the objects may be defined in the monocular image based on the altered focus point.

A contrast component 1020 may be configured to alter a darkness property of an object of the set of the objects in the monocular image. The darkness property indicates spatial relationships between the objects.

According to an implementation, the system 1000 includes an intersection simulation component 1022 that may be configured to extend a series of lines from a perimeter of an object of the set of the objects. The series of lines may intersect another series of lines extending from another perimeter of another object of the set of the objects. Further, an intersection of the series of lines and the other series of lines may indicate relative depths of the object and the other object.

Figure 11:
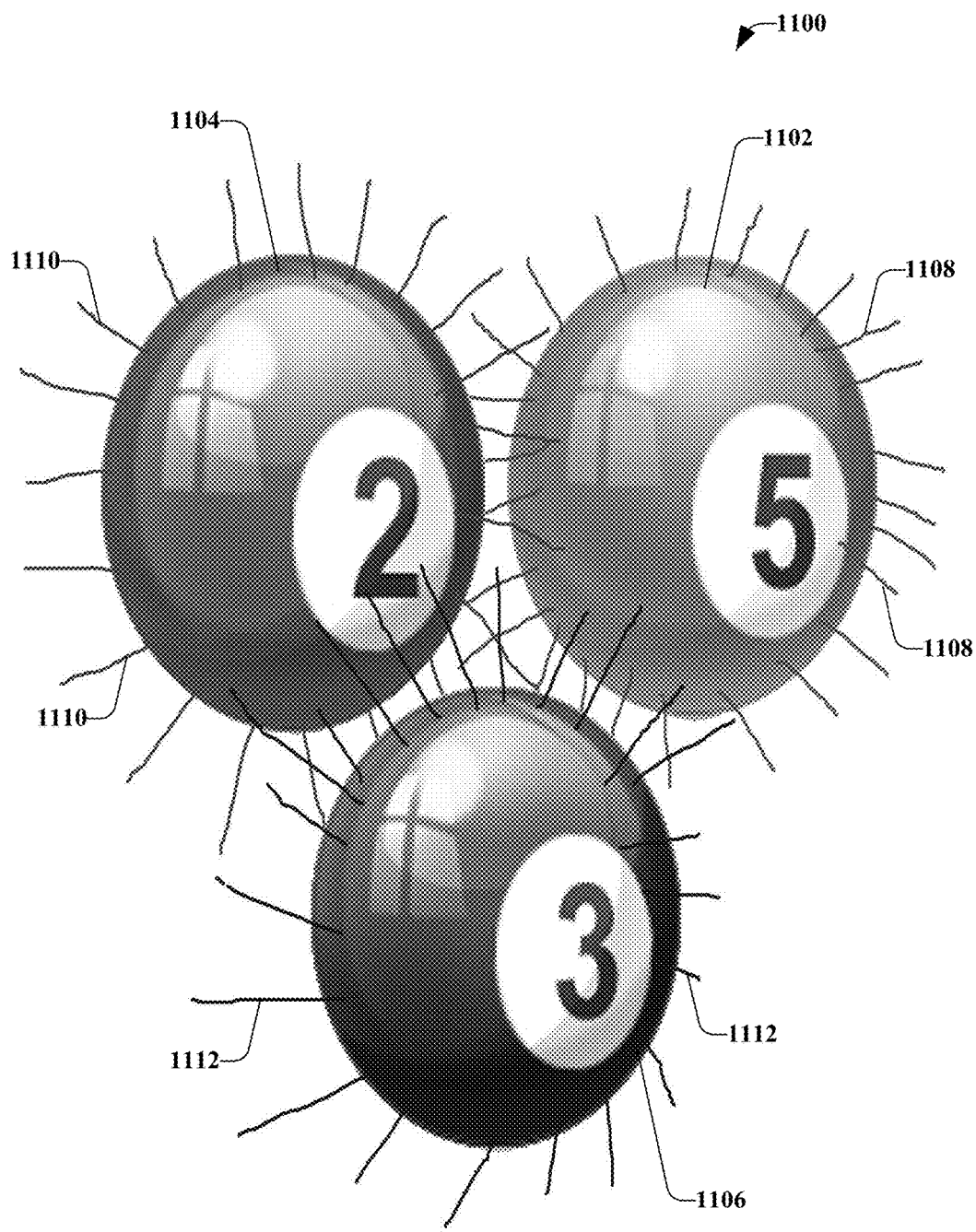
FIG. 11 illustrates a non-limiting representation of a monocular image that includes objects that have been manipulated to simulate depth based on respective series of lines extending from respective perimeters of the objects.

FIG. 11 illustrates a non-limiting representation of a monocular image 1100 that includes objects that have been manipulated to simulate depth based on respective series of lines extending from respective perimeters of the objects. These objects may include a first object 1102, a second object 1104, and a third object 1106 (although fewer or more objects may be included in a monocular image). As illustrated, the objects may be a set of billiard balls.

In FIG. 11, each object may comprise lines extending from respective perimeters of the objects. For example, the intersection simulation component 1022 may be configured to associate a first set of extending lines 1108 with the first object 1102, a second set of extending lines 1110 with the second object 1104, and a third set of extending lines 1112 with the third object 1106. It is noted that only a few lines of each of the first set of extending lines 1108, the second set of extending lines 1110, and the third set of extending lines 1112 are labeled for simplicity purposes.

Further, although the extending lines are described as having a same color as the associated object, the disclosed aspects are not limited to this implementation. Instead, different colors, or different manners of representing colors may be utilized. Further, some objects will have multiple colors (e.g., a person might be wearing a skirt of one color, a blouse of a second color, and a skin tone of a third color). In these cases, the extending lines might represent the outer perimeter of the object, where the lines associated with the object may be composed of two or more colors.

According to some aspects, the lines associated with each object may have a length that represents the relative distances between the objects. For example, longer lines may represent a further distance, while shorter lines may represent shorter distances. In some aspects, one or more objects may have extending lines that extend beyond the edges of nearby objects, as illustrated by the third set of extending lines 1112. In an implementation, at least a portion of the lines may be given an appearance similar to a "halo" or "starburst". In example, the "halo" or "starburst" appearance may be displayed in a manner that appears similar to halos or starbursts that occur naturally as a result of optical characteristics of glasses, contacts, glass, corneal characteristics, eye lens characteristics, or other factors.

With continuing reference to FIG. 10, the system 1000 may also include an overlay component 1024 that may be configured to create transparent images of the objects to indicate depth perception. The overlay component 1024 may be configured to create a transparent image of a first object. The transparent image may be larger than the first object and coincident with the first object. Further, the overlay component 1024 may be configured to create another transparent image of a second object. The other transparent image may be larger than the second object and coincident with the second object. The transparent image of the first object and the other transparent image of the second object may be utilized to indicate depth perception.

Figure 12:
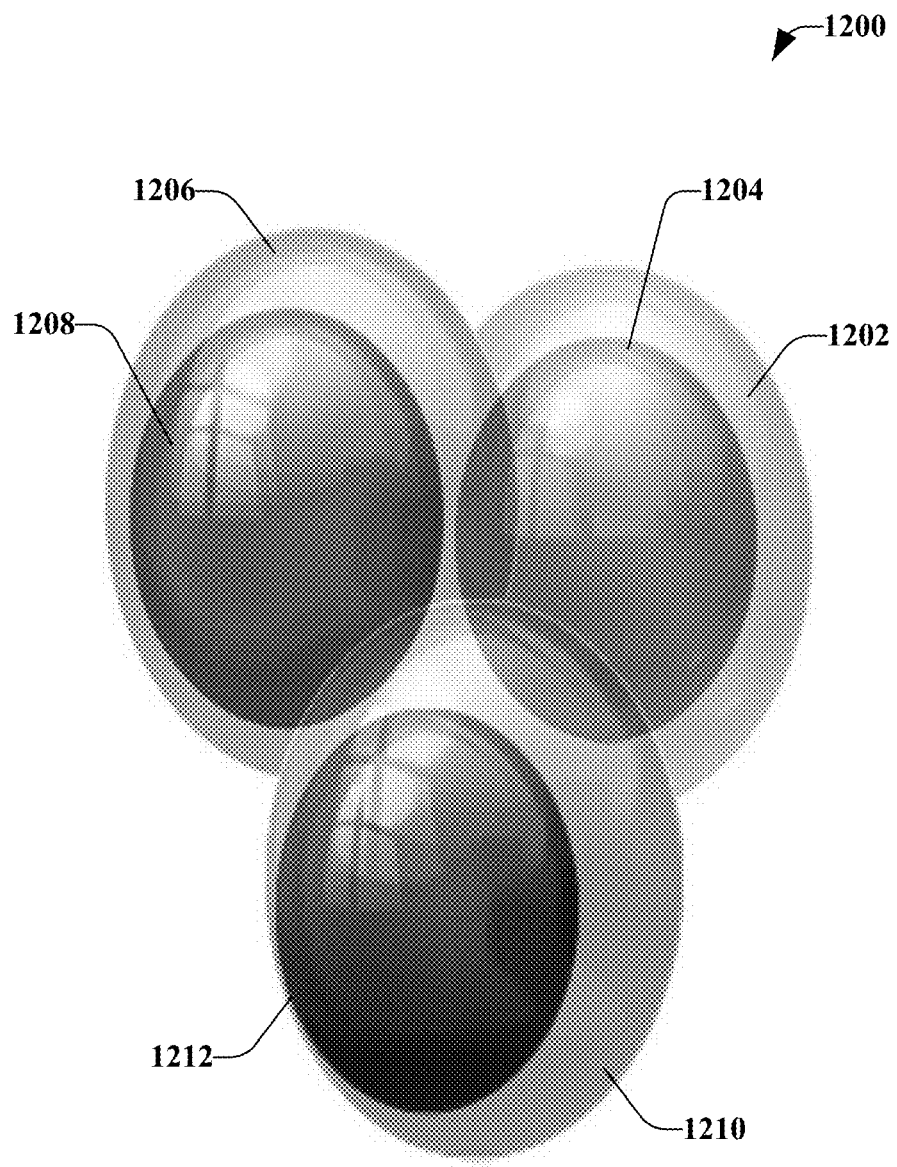
FIG. 12 illustrates a non-limiting representation of a monocular image that includes objects that have been manipulated to simulate depth using transparency.

Referring now to FIG. 12, illustrated is a non-limiting representation of a monocular image 1200 that includes objects that have been manipulated to simulate depth using transparency. As discussed above, the overlay component 1024 may be configured to create a first transparent image 1202 of a first object 1204. As illustrated, the first transparent image 1202 may be larger than the first object 1204 and coincident with (e.g., overlapping) the first object 1204. The first transparent image 1202 may be placed over (or under) the first object 1204.

Further, the overlay component 1024 may be configured to create a second transparent image 1206 of a second object 1208. The second transparent image 1206 may be larger than the second object 1208 and coincident with (e.g., overlapping) the second object 1208. The second transparent image 1206 may placed over (or under) the second object 1208.

The overlay component 1024 may also be configured to create a third transparent image 1210 of a third object 1212. The third transparent image 1210 may be placed over (or under) the third object 1212 and may be coincident with the third object 1212.

The first transparent image 1202, the second transparent image 1206, and the third transparent image 1210 may be utilized to indicate depth perception. For example, as illustrated in FIG. 12, the third transparent image 1210 is coincident with the third object 1212, but is shifted toward (e.g., offset from the third object 1212) the first object 1204 and the second object 1208. In a similar manner, the first transparent image 1202 and the second transparent image 1206 are offset from the first object 1204 and second object 1208, respectively, in order to simulate depth perception.

With continuing reference to FIG. 10, a machine learning and reasoning component may be implemented in the system 1000. The machine learning and reasoning component may employ principles of probabilistic and decision theoretic inference and rely on predictive models constructed through the use of machine learning procedures. Logic-centric inference may also be employed separately or in conjunction with probabilistic methods. For example, the machine learning component may infer distances between a reference point and objects and distances between the objects. Such distances may be inferred by obtaining knowledge about the various other parameters of the viewing area, including lighting (e.g., interpreting between shadows and dark objects), geographic variations (e.g., a large object on a distant high point might appear closer than a small object that is close to the reference point). The machine learning component may also infer preferences of a user related to how the depth data should be presented (e.g., colored lines, patterned lines, altered focus point, extended lines, transparent objects, and so on). Based on this knowledge, the machine learning component may make an inference based on which objects to alter, what attributes of the object should be altered, and so on.

The various aspects (e.g., in connection with conveyance and modification of objects as it relates to spatial relationships and other relationships) may employ various artificial intelligence-based schemes for carrying out various aspects thereof. For example, a process for determining if a particular object is located a certain distance away from a reference point, and which modification should be made based on the object type or a user preference may be enabled through an automatic classifier system and process.

A classifier is a function that maps an input attribute vector, $x=(x1, x2, x3, x4, xn)$, to a confidence that the input belongs to a class, that is, $f(x)$=confidence (class). Such classification may employ a probabilistic and/or statistical-based analysis (e.g., factoring into the analysis utilities and costs) to prognose or infer an action that a user desires to be automatically performed. In the case of objects, for example, attributes may be object distance data, object interaction data, and object importance data (e.g., when driving a car a pencil on the street may not be important, but a person in the street may be important) and the classes are types or categories of objects, types or classifications of participants, and object distance data.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

The one or more aspects may employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) may be used to automatically learn and perform a number of functions as described herein.

As discussed herein, various manners of simulating depth perception and/or to demonstrate spatial relationships between objects, may be exaggerated to provide more accurate, more apparent, and/or exaggerated distance data. For example, "exaggerated" spatial relationships may include, in some aspects, an increase in apparent distance, a decrease in apparent distance, or an increase or no change in apparent distance for objects within a certain range or ranges of distance from the user. Further, the exaggerated spatial relationships may include, in some aspects, a decrease or no change in apparent distance for objects within a second certain range or ranges of distance from a user, and when desirable, a third or more additional ranges with different exaggeration.

Various cues may exist that allow estimation of distance and/or movement based on monocular vision. One or more of these may be altered as appropriate to better represent the actual distance to an object (or, in one aspect, may be exaggerated to create a perception that the object is closer or further, or moving faster or slower than the object actually is moving). These cues may be utilized in a manner similar to that illustrated with regard to the cues above and/or as described elsewhere herein.

These cues may include accommodation, aerial perspective, curvilinear perspective, defocus blur, depth from motion/depth from optical expansion, elevation, familiar size, kinetic depth effect, lighting and shading, motion parallax, occlusion or interposition, and perspective. These cues may also include progressive blocking of color spectrum (such as the loss of certain light frequencies in light passing through a specified volume of water), relative size, and texture gradient of the current field of view. Such data may help the user interact with, or navigate the current environment, or otherwise make highly accurate dimension related decisions.

While in real time, humans generally rely on the brain's approximations of distance and space using environmental clues and parallax, the various aspects disclosed herein may provide the user with very accurate and precise measurements of their environment. In one example, a user may be driving and receive accurate data regarding placement of the driver in relation to the objects around them. The system may identify the object directly in front of the user to be a car that is 13.375 meters in front of the user's vehicle. A wearable device may be paired with the vehicle that the user is in, the GPS, or user's smartphone, the wearable may detect that the user is traveling at 85 kph, and alert the user that the current following distance is insufficient to stop safely without hitting the leading car 95% of the time. The wearable device may include a device that projects on glass or another surface, that is viewable to the user, or otherwise sends data to the user's eye, or eyes, or ocular nerves without being directly worn.

The alert may be made by presenting the user with an overlay of a red dimension line that extends from the hood of the user's car to the bumper of the leading car. Upon increasing the following distance to increase safety, the overlay of the dimension line may gradually change from red to yellow to green as the following distance is optimized. Where vehicles have automated or assisted accident avoidance technology, such warning information may be calibrated relative to capabilities of automated or assisted accident avoidance technology.

In another aspect, data may be presented in a way that makes more accurate (or in some cases exaggerates) the cues that are used, in the absence of stereopsis or in addition to stereopsis. For example, the distance from an oncoming motorcycle at night may be inferred by the combination of the intensity of the light and the size of the light. In the absence of any headlight, an artificial headlight may be displayed by the system. If the actual headlight is four times dimmer than the average headlight, or if the actual headlight is smaller than a normal headlight, the user may believe the motorcycle is further away than it really is. In such a case, the system may alter the appearance of the headlight, for example by making the dimmer headlight appear as intense as a normal headlight would appear at the actual measured distance.

In one aspect, the headlight modification may be achieved by using a heads-up display or other mechanism. In another example, a user may be either standing on a high ledge or platform looking down, or at a low point looking up, and needs to know the actual distance to the point below or above them respectively. Similarly, a user may be attempting to thread a needle and need to know the distance between the tip of the thread and the eye of the needle. In one aspect, the display may overlay or otherwise make available an actual or synthesized side view, which view may be magnified or reduced in size. The view may be accompanied (as a side view, the direct view, or a combination) by numerical measurements.

One or more aspects presented herein may utilize a number of data points to determine the distance of objects and/or the speed of objects. Self-reported distance and speed, GPS, triangulation, sonar, radar, Doppler data, red shift, binocular cameras, measurement of signal strength, use of multiple cameras, or other mechanisms are among the means this may be achieved. The distance measurement methods described in U.S. Pat. No. 8,593,565 issued to one of the instant inventors, Gary Shuster, and incorporated by reference in its entirety herein, may also be utilized to measure distance and/or for the other purposes described in that patent.

In one aspect, the device may be programmed with certain common tasks. The device may also learn common tasks, obtain tasks from a database, have tasks described to it by a user, or otherwise obtain data about or infer the likely goal of the user. In one aspect, the user may identify the task explicitly, optionally including the elements of the task (such as needle eye and thread). The device would then display data specific to that task. Using a needle and thread example, the device may magnify the display of the needle eye and thread, and display a set of arrows for up, down, left, right, and forward to guide the user in achieving the task.

In several common tasks, such as driving at night, efficacy of natural binocular vision declines with distance. As such, beyond approximately seven meters, even properly functioning binocular vision may be supplemented in a manner that improves the driver's safety. A similar need exists for other tasks whereby distance or darkness reduces the efficacy of binocular vision. To illustrate, stars, as viewed from the surface of the earth, are point sources, and binocular vision is not useful in determining which star is more distant than the other stars. Thus, for tasks where distance or other facts reduce the efficacy of binocular vision, it is desirable to engage in the modification or exaggeration of monocular distance and speed cues described above. The augmented reality overlays that provide the user with information may also be removed at the command of the user via gestures. As an example, to deactivate or remove the dimension lines the user may waive his hand in front of the instant lens as if the user was wiping debris from the lens. In order to restore the dimension line overlay, the user may perform the opposite gesture, as another example. Verbal commands may also be used.

In one aspect, 3D motion detecting cameras such as the Microsoft Kinect™ may be utilized to control a user interface (UI) using the human body. When integrated into a system, such as any of the systems discussed herein, gestures may be used navigate through a UI that may only be seen by the user. In one aspect, the interface may be navigated by pupil movement. In another aspect, one may jump directly to views in the interface with voice control. For instance, in order to display the AR dimension line overlay UI, the user could say a command like "show dimensions" rather than navigating through a menu.

Since the various aspects may be utilized with a wearable display, the UI may, in some aspects, be made sparse so as to not be cluttered or otherwise detract from users experience or distract users' from their daily activities. The system menu may appear as a simple square or other simple geometric shape such as a circle or hexagon. The user may bring the menu into an active state by gesturing the menu into focus with a swipe, originating from the outside of the display into the center of the display, glancing at the menu icon with one's pupil, or giving the system the command, "open menu" or simply saying "menu". The menu may present as a circular carousel of menu items that may be panned through using left and right swipe gestures, looking to the left or right or by giving the commands, "next right" or next left." The menu item in focus may always be the center item, for example. The depth of the interface may be suggested using effects such as Gaussian blur, object size, lightness, darkness, and/or opacity of the objects.

An item in focus may be brought forward into an active state by using a pulling gesture, blinking twice or giving the system the voice command, "select." An active item may present in the form of a stack of windows. A user may progress through a stack of windows by motioning the hand forward towards the body of the user as if the user was motioning for some to come forward. The user may also advance through the stack by blinking once quickly or giving the system the vocal command, "forward." Conversely, the user may move back through the stack by the stack by motioning the hand away from the invention as if the user was pushing something away. Additionally the user may advance through the stack by blinking slowly or giving the system the vocal command, "backward," or a similar command.

When displaying on potentially data intensive interfaces such an AR dimension line overlay, the UI may be layered such that the most relevant dimension lines, those closest to the user, are displayed on an active layer in the forefront. The dimension lines that are less critical to navigating the user's environment may be moved to an inactive layer in the background.

Some aspects disclosed herein may include coupling stereoscopic and 3D motion sensing cameras with a device such as Google Glass™. In one aspect, the device may produce the view that the injured eye would see if not damaged to aid them in perceiving depth as discussed herein. Additionally the device may use object identification to aid the user in navigating environments. Either using the stereoscopic or depth sensing 3D camera, the device may directly aid in making up for the users inability to detect depth. Furthermore, the camera(s), stereoscopic, 3D depth sensing or regular 2D camera may detect and display distance in an overlay on the user's view of the environment. If using the stereoscopic or 3D cameras, depth and distance from objects may be detected similar to how the eyes do the same thing.

With regard to 2D cameras, where a 2D camera is moving (or where an object is moving relative to the 2D camera), distance may be determined using artificial stereoscopic data generated by comparing frames taken by the 2D camera at two or more different locations (or with the object at two or more different locations). Additionally a 2D camera may achieve similar functionality by using trigonometry after detecting its location or height from the ground (e.g., the user's height). In one aspect, there may be different models based on the three different camera systems, or combinations thereof. In another aspect, the device may create some appearance of 3-dimensionality for the user using the system. When desired the device may produce a live overlay of the measured environments, displaying how far the user is from objects. Because of the 3D depth perceiving cameras, the device may respond to gestures. For instance, if the user wants to remove the Measurement Heads-Up-Display (HUD) overlay, the user may use a wiping gesture to the right, as if they were wiping their eyes. To bring the HUD back (make the HUD visible again, the user may make another gesture, such as a wiping gesture to the left.

In accordance with some aspects, the system may detect what the user was or is doing based upon acceleration data from their mobile device, object identification, GPS data, or other ambient or available data. For instance, if the user is in a moving car and the user's phone was connected to the car (for example, by Bluetooth) and/or the user was moving at 45 mph, the device could infer that the user was driving and display data about following distance or braking distance (e.g., 4 yards between you and a vehicle in front of you—break: 100 feet down to 0 feet).

In some aspects, the device may not display those words but could convey that data with lines and numbers. In some aspects, the display may ask the user to clarify the task at hand, the type of help requested, or may suggest to the user help it may provide. In another aspect, the display modifications and data may be minimized to reduce user distraction, and such modifications or minimization may be automatically and/or manually related to the task the user is performing. In other aspects, the device may respond to verbal commands and/or physical gestures.

Returning to interposition of artificial elements (such as a grid) to create one or more additional indicia of distance and relative spatial position, there may be aspects discussed herein where it may be desirable that analog or other data may be displayed in conjunction with the artificial elements (such as a grid). In such a case, the grid line may be obscured in part, based on the location of the viewer relative to the analog or other data. Taking as an example a driver of a vehicle where a grid is used, consider where the grid is a single color representing a single distance, for example a red grid representing a distance of 10 meters.

The system may project the grid on the windshield, taking into account (calculated using data obtained via measurement devices or otherwise) the position of the driver's eyes (or, in the case of a driver with monocular vision, the active eye, or, in the case of a driver with a dominant eye, the dominant eye). The portions of the grid that would be obscured if the grid were actually a physical thing located at 10 meters may be obscured (or not projected, or blocked by a user's heads-up display), as seen from the perspective of the driver. In one aspect, a polarizing device, microshutters, or other mechanisms may be utilized to minimize or eliminate the view of the grid by other users and/or from other positions.

Figure 13:
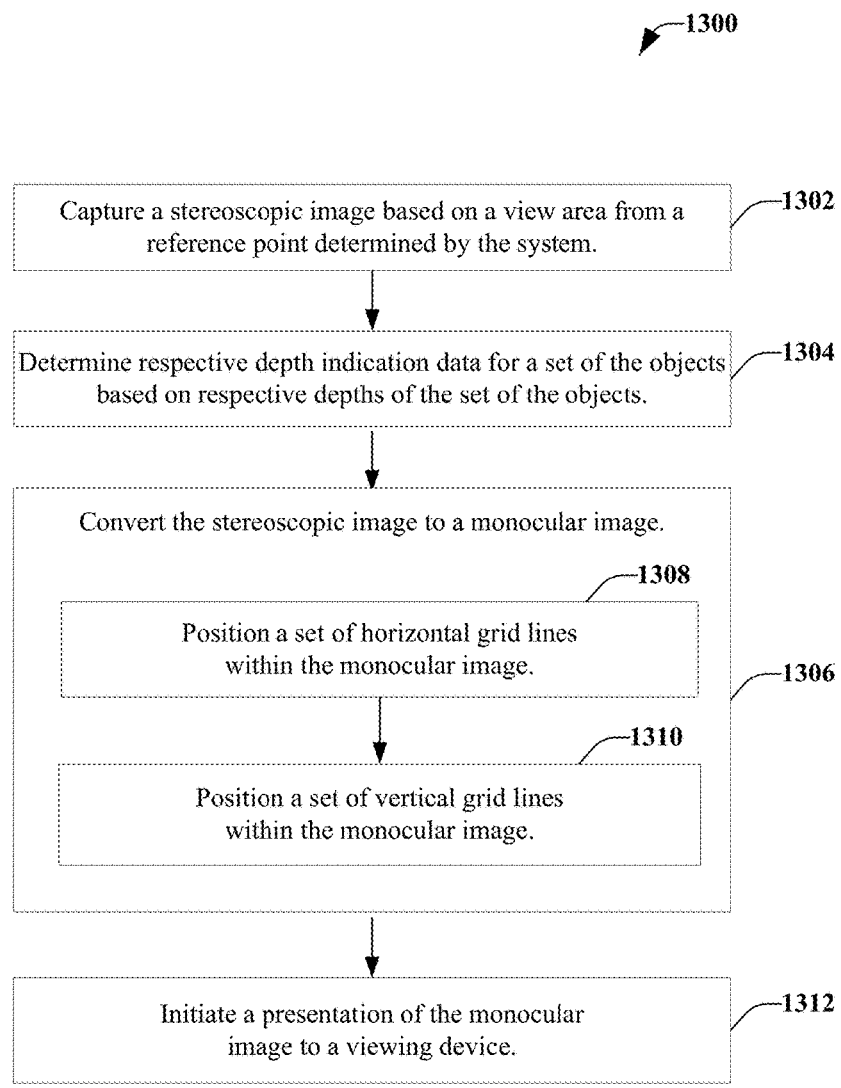
FIG. 13 is a flow diagram illustrating an example, non-limiting embodiment of a method to simulate depth of objects.

FIG. 13 is a flow diagram illustrating an example, non-limiting embodiment of a method 1300 to simulate depth of objects. The flow diagram in FIG. 13 may be implemented using, for example, any of the systems, such as the system 300 (of FIG. 3), described herein.

Beginning at block 1302, capture a stereoscopic image based on a view area from a reference point determined by the system. The reference point may be a current location of a user, or a predicted location of the user (e.g., which may be determined based on a predicted direction and speed of the user). The view area may be at least a portion of a viewing range of the user. For example, by moving the eyes it is possible to see in different directions. Therefore, when a capturing device, such as a pair of glasses or one or more cameras (or other sensors) are utilized to capture the image, the capturing device may not know precisely where the user may be looking. For example, the user may be facing straight ahead but might be looking toward the left. Thus, the capturing device may capture the image in the direction the user is facing.

Further, the stereoscopic image comprises objects, which may be living objects (e.g., a human, an animal, a plant, and so on) or may be non-living objects (e.g., a boat, a building, a book, a knife, and so on). Although illustrated herein with respect to a single type of object, the disclosed aspects are not limited to this implementation. Instead, multiple objects may be within the stereoscopic image and each of the objects may be different. Block 1302 may be followed by block 1304.

At block 1304, determine respective depth indication data for a set of the objects. The respective depth indication data may be determined based on respective depths of the set of the objects, wherein the respective depths are respective distances determined between the reference point and the set of the objects. Block 1304 may be followed by block 1306.

At block 1306, convert the stereoscopic image to a monocular image. The monocular image may include the depth indication data for the set of the objects. Block 1306 may include block 1308. At block 1308, position a set of horizontal grid lines within the monocular image. The set of horizontal grid lines may have a first color, a first pattern, a first thickness, or another manner of distinguishing the horizontal grid lines. Block 1308 may be followed by block 1310.

At block 1310, position a set of vertical grid lines within the monocular image. The set of vertical grid lines may have a second color (different from the first color), a second pattern (different from the first pattern), a second thickness (different from the first thickness), or another manner of distinguishing the vertical grid lines from the horizontal grid lines. The set of horizontal grid lines may represent a first depth and the set of vertical grid lines may represent a second depth. Further, the set of objects may be interposed among the set of horizontal grid lines and the set of vertical grid lines based on the respective depths.

Block 1304 and/or block 1310 may be followed by block 1312. At block 1312, initiate a presentation of the monocular image to a viewing device. The viewing device may be at least one of an eye, an eyeball object, glasses, a wearable device, a vehicle windshield, or a display screen. Further, the monocular image simulates depth perception.

Figure 14:
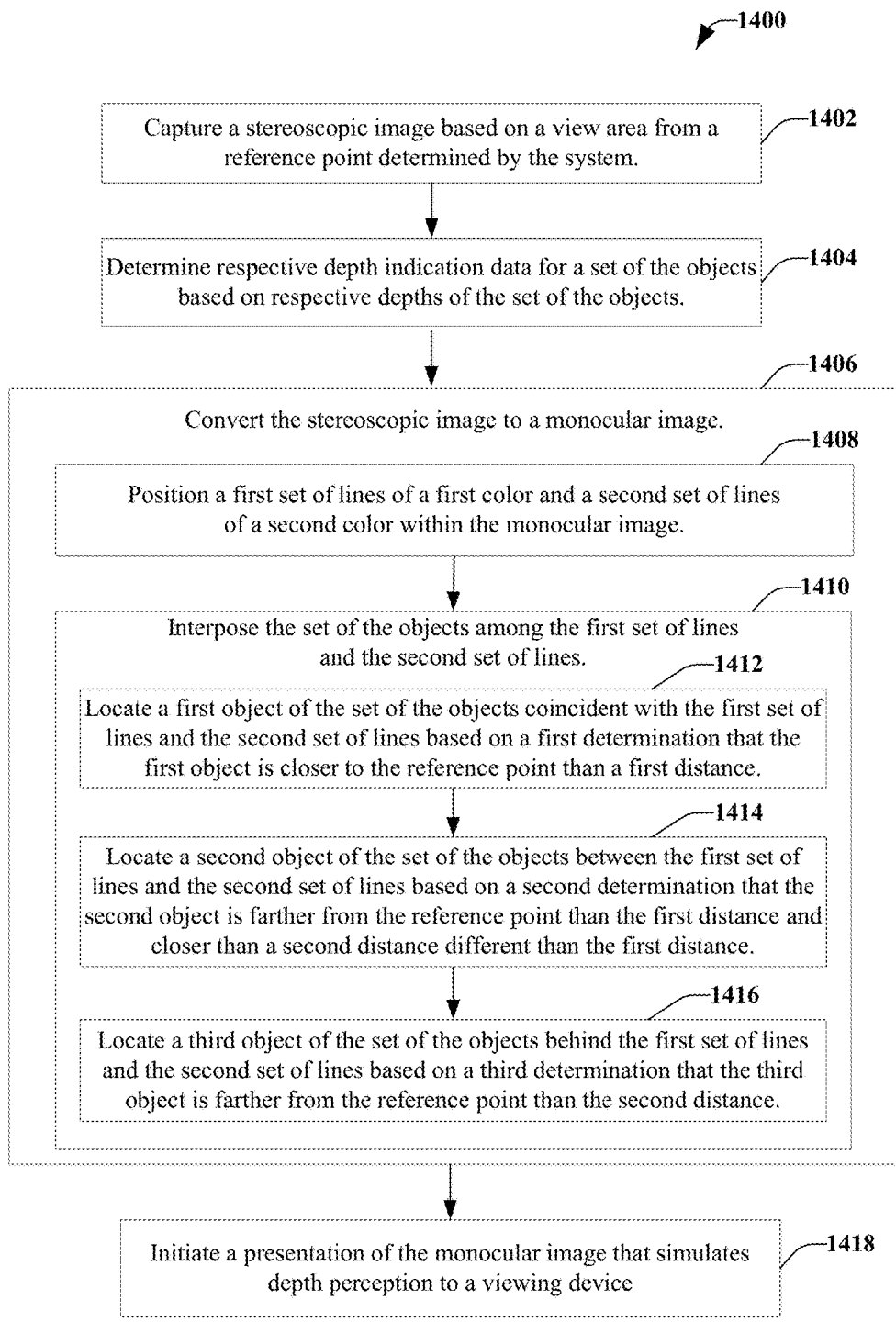
FIG. 14 is a flow diagram illustrating an example, non-limiting embodiment of a method to simulate spatial relationships between a reference point and one or more objects.

FIG. 14 is a flow diagram illustrating an example, non-limiting embodiment of a method 1400 to simulate spatial relationships between a reference point and one or more objects. The flow diagram in FIG. 14 may be implemented using, for example, any of the systems, such as the system 700 (of FIG. 7), described herein.

At block 1402, capture a stereoscopic image that comprises one or more objects. The stereoscopic image may be captured by various sensors, including a camera or a set of cameras. Block 1402 may be followed by block 1404.

At block 1404, determine distances (or depths) between each of the objects and a reference point. The determined distances may be represented as depth indication data. The reference point may be the location of the one or more sensors, or might be a different location, such as a future location. For example, a user (and the one or more cameras) is traveling in a vehicle on a highway at a high rate of speed. In this case, due to the rate of speed, it may be more beneficial to estimate the future distance between the user (e.g., the car) and the one or more objects, rather than measuring a current distance. The future location may be determined based on a processing speed needed to calculate and output the respective distances, or based on another parameter. Block 1404 may be followed by block 1406.

At block 1406, convert the stereoscopic image to monocular image that includes the one or more objects and the depth indication data. Block 1406 may include block 1408. At block 1408, position a first set of lines of a first color and a second set of lines of a second color within the monocular image. The first color and the second color may be different colors. However, according to some implementations, instead of using color, another manner of distinguishing the lines from each other might be utilized, such as line pattern and/or line thickness. According to an aspect, the first set of lines and the second set of lines may be oriented as horizontal lines and vertical lines. However, a different orientation of lines may be utilized, such as diagonal lines. Block 1408 may be followed by block 1410.

At block 1410, interpose the set of the objects among the first set of lines and the second set of lines. For example, depending on respective distances between the objects and the reference point, one or more objects may be placed to appear to be behind the sets of lines, between the first set of lines and the second set of lines, or in front of the set of lines. The perceived color of the first set of lines and the second set of lines may indicate depth perception. Block 1410 may include block 1412.

At block 1412, locate a first object of the set of the objects coincident with the first set of lines and the second set of lines based on a first determination that the first object is closer to the reference point than a first distance. The first object obstructs a view of the first set of lines and the second set of lines in the monocular image. Block 1412 may be followed by block 1414.

At block 1414, locate a second object of the set of the objects between the first set of lines and the second set of lines based on a second determination that the second object is farther from the reference point than the first distance and closer than a second distance different than the first distance. A view of the second object is obstructed by the first set of lines and the first color in the monocular image. Block 1414 may be followed by block 1416.

At block 1416, locate a third object of the set of the objects behind the first set of lines and the second set of lines based on a third determination that the third object is farther from the reference point than the second distance. The first set of lines and the second set of lines overlap the third object in the monocular image. Block 1406, block 1410, and/or block 1416 may be followed by block 1418.

At block 1418, initiate a presentation of the monocular image that simulates depth perception to a viewing device. The viewing device may be at least one of an eye, an eyeball object, glasses, a wearable device, a vehicle windshield, or a display screen.

Figure 15:
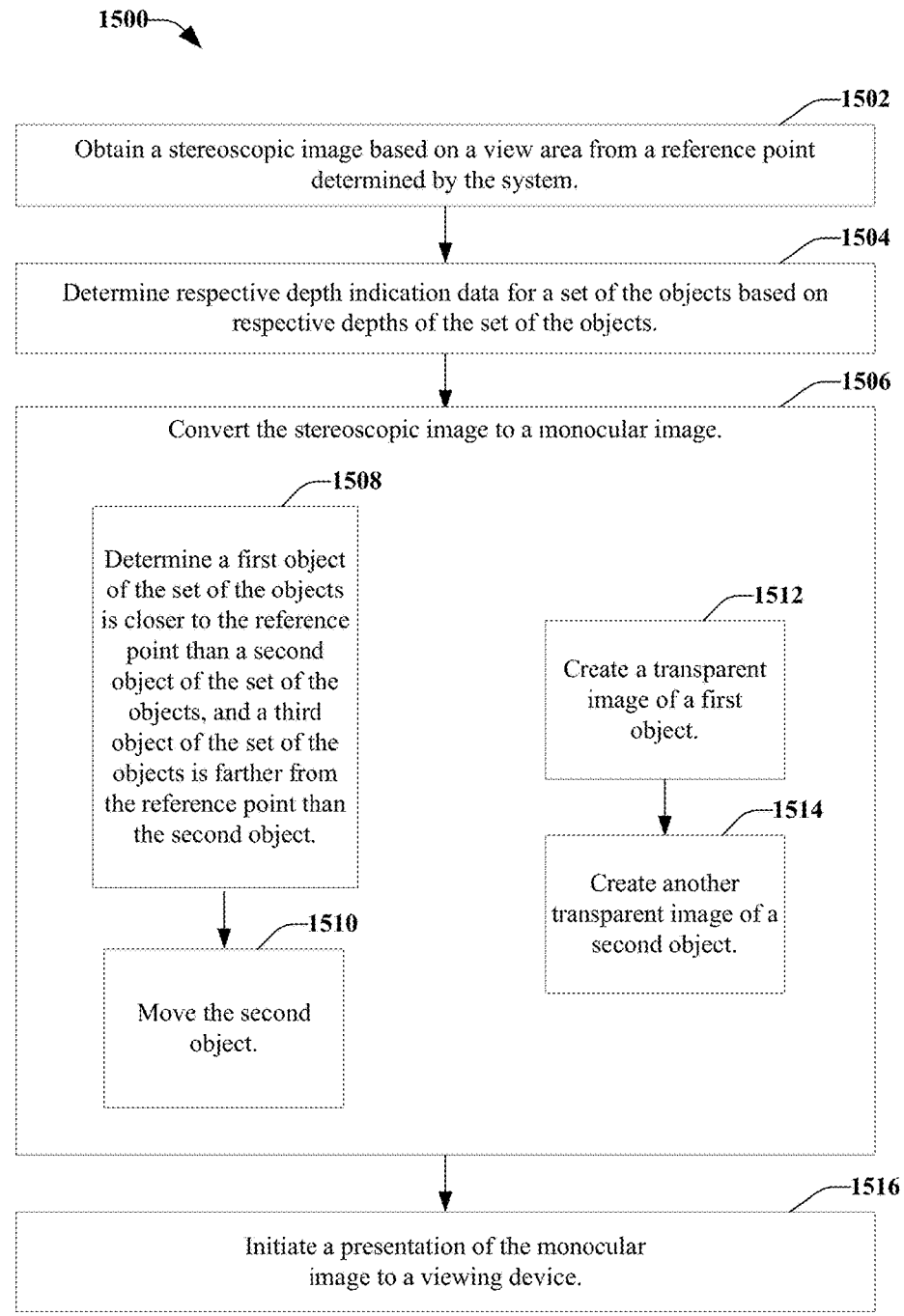
FIG. 15 is a flow diagram illustrating an example, non-limiting embodiment of a method to improve visualization of spatial and other relationships.

FIG. 15 is a flow diagram illustrating an example, non-limiting embodiment of a method 1500 to improve visualization of spatial and other relationships. The flow diagram in FIG. 15 may be implemented using, for example, any of the systems, such as the system 1000 (of FIG. 10), described herein.

At block 1502, obtain a stereoscopic image that comprises one or more objects, which may be of a different type, shape, and size. Further, two or more objects may be located as different distances measured from a reference point. Block 1502 may be followed by block 1504.

At block 1504, determine the respective distances between each of the objects and the reference point. The determined distances may be represented as depth indication data. Block 1504 may be followed by block 1506.

At block 1506, convert the stereoscopic image to monocular image that includes the one or more objects and the depth indication data. Block 1506 may include block 1508.

At block 1508, determine a first object of the set of the objects is closer to the reference point than a second object of the set of the objects, and a third object of the set of the objects is farther from the reference point than the second object. Block 1508 may be followed by block 1510.

At block 1510, move the second object. After the second object is moved, the second object may be interposed between the first object and the third object in the monocular.

Alternatively or additionally, block 1506 may include block 1512. At block 1512, create a transparent image of a first object. The transparent image of the first object may be larger than the first object and coincident with the first object. Block 1512 may be followed by block 1514.

At block 1514, create another transparent image of a second object. The other transparent image of the second object may be larger than the second object and coincident with the second object. The transparent image of the first object and the other transparent image of the second object may indicate depth perception.

Block 1506, block 1510, and/or block 1514 may be followed by block 1516. At block 1516, initiate a presentation of the monocular image that simulates depth perception to a viewing device. The viewing device may be at least one of an eye, an eyeball object, glasses, a wearable device, a vehicle windshield, or a display screen.

Figure 16:
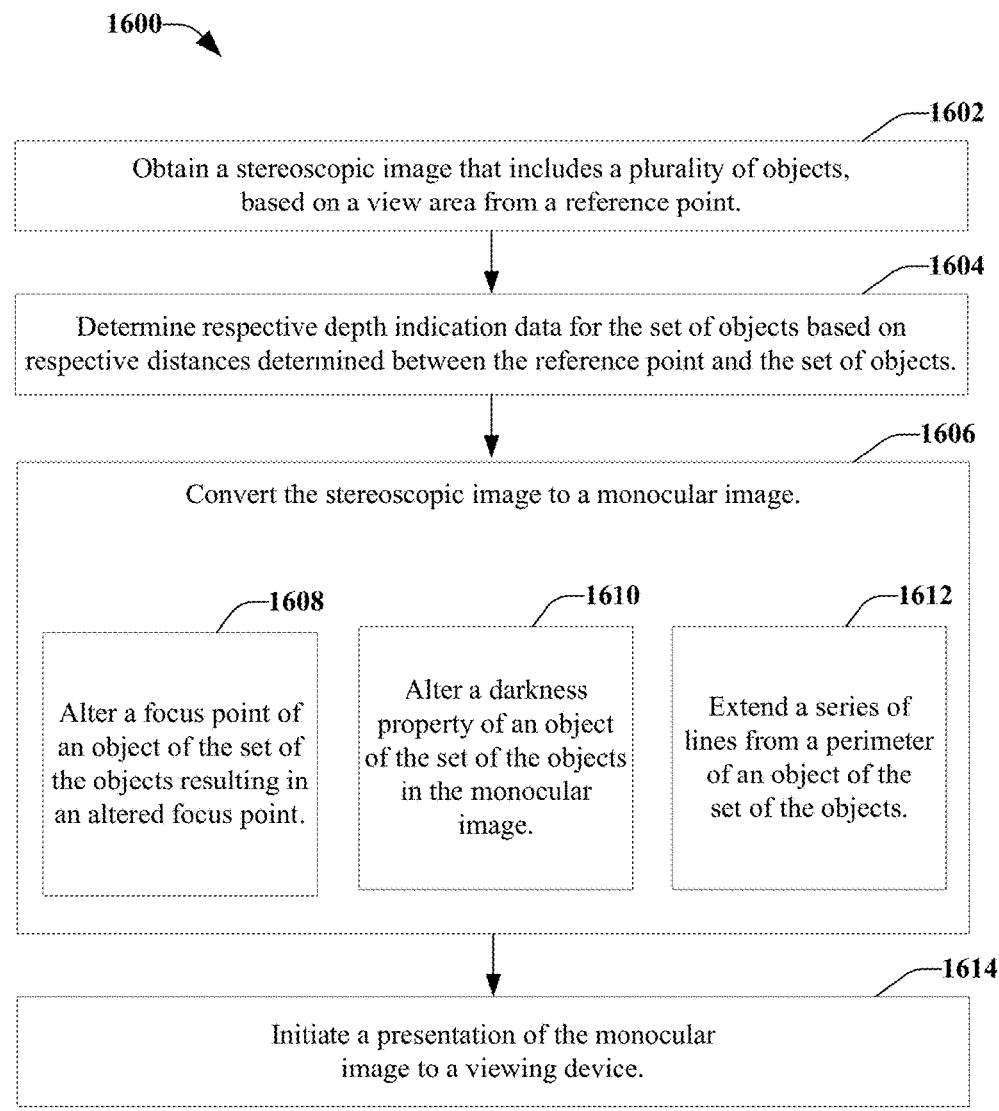
FIG. 16 is a flow diagram illustrating an example, non-limiting embodiment of a method to improve visualization of spatial and other relationships.

FIG. 16 is a flow diagram illustrating an example, non-limiting embodiment of a method 1600 to improve visualization of spatial and other relationships. The flow diagram in FIG. 16 may be implemented using, for example, any of the systems, such as the system 1000 (of FIG. 10), described herein.

At block 1602, obtain a stereoscopic image, which includes a plurality of objects, based on a view area from a reference point. The stereoscopic image may be obtained by one or more sensors. Block 1602 may be followed by block 1604.

At block 1604, determine respective depth indication data for the set of objects based on respective distances determined between the reference point and the set of objects. Objects of the set of objects may be located at different distances away from the reference point. Block 1604 may be followed by block 1606.

At block 1606, convert the stereoscopic image to a monocular image. The monocular image may include the depth indication data. Block 1606 may include block 1608, block 1610, and/or block 1612.

At block 1608, alter a focus point of an object of the set of the objects resulting in an altered focus point. For example, the focus point of the object may be altered based on a distance determined for the object and one or more other objects. The focus point may facilitate simulation of a spatial relationship between at least two objects of the set of objects in the display. Thus, spatial relationships between the objects are defined in the monocular image based on the altered focus point.

At block 1610, alter a darkness property of an object of the set of the objects in the monocular image. The darkness property may include artificially darkening certain objects in order to indicate relative distance. Thu, the darkness property may indicate spatial relationships between the objects. Further, areas near or around, or at a similar distance to, the objects, may be darkened in some aspects in a manner similar to the way the objects themselves are darkened. It is also noted that "darkening" objects should be understood to include, in some implementations, making some objects lighter, whether or not other objects are darkened. Taking as a further example a visual field with the same three objects where the three objects are all illuminated in direct sunlight, this aspect may include darkening objects in a manner similar to a graduated camera lens filter, with the lighter elements of the filter applying to closer objects in the field and the darker applying to more distant objects.

At block 1612, extend a series of lines from a perimeter of an object of the set of the objects. The series of lines intersect another series of lines extending from another perimeter of another object of the set of the objects. Further, an intersection of the series of lines and the other series of lines indicate relative depths of the object and the other object. Block 1606, block 1608, block 1610, and/or block 1612 may be followed by block 1614.

At block 1614, initiate a presentation of the monocular image that simulates depth perception to a viewing device. The viewing device may be at least one of an eye, an eyeball object, glasses, a wearable device, a vehicle windshield, or a display screen.

Figure 17:
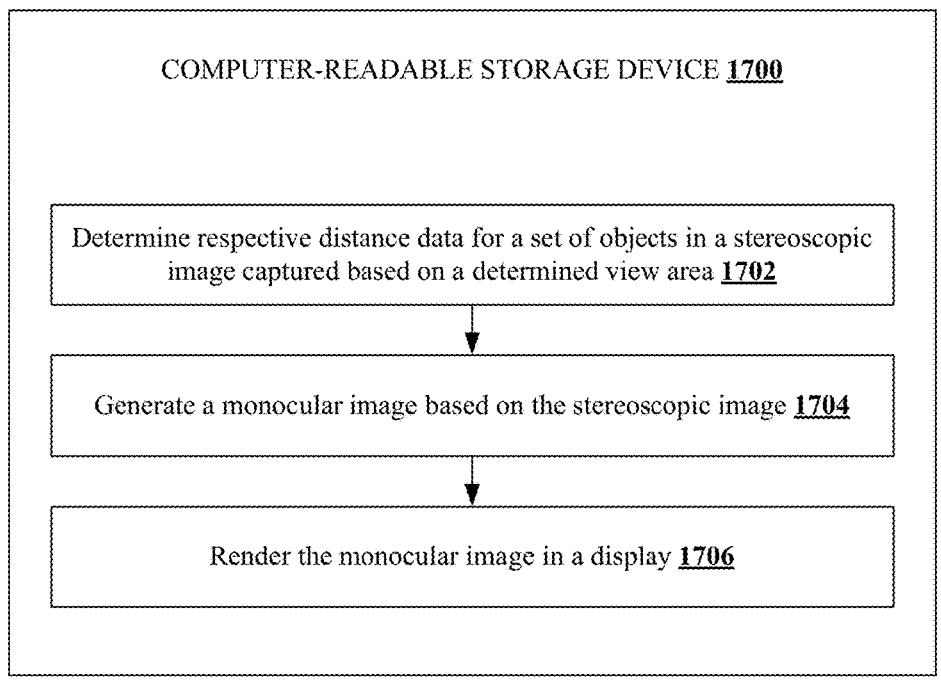
FIG. 17 illustrates a flow diagram of an example, non-limiting embodiment of a set of operations to provide indications of spatial relationships and other relationships between a reference point and one or more objects.

FIG. 17 illustrates a flow diagram of an example, non-limiting embodiment of a set of operations for providing indications of spatial relationships and other relationships between a reference point and one or more objects. A computer-readable storage device 1700 may include executable instructions that, in response to execution, cause a system comprising a processor to perform operations.

At 1702, these operations may cause the system to determine respective distance data for a set of objects in a stereoscopic image captured based on a determined view area. The distance data may be based on respective distances between a reference point and the set of objects.

At 1704, the operations may cause the system to generate a monocular image based on the stereoscopic image. At 1706, the operations may cause the system to render the monocular image in a display. The monocular image may simulate spatial relationships between objects of the set of objects. The display may include an eye, an eyeball object, a wearable device, a vehicle windshield, or a display screen.

The monocular image may comprise the set of objects and the distance data. For example, the operations may cause the system to incorporate a set of vertical lines of a first color and a set of horizontal lines of a second color within the monocular image. Further to this example, the objects of the set of objects may be interposed among the set of vertical lines and the set of horizontal lines.

In another example, the operations may cause the system to locate a first object of the set of objects that is coincident with the set of vertical lines and the set of horizontal lines based on a first determination that the first object is closer to the reference point than a first distance. The first object obstructs a view of the set of vertical lines and the set of horizontal lines in the monocular image.

Further to this example, the operations may cause the system to locate a second object of the set of objects between the set of vertical lines and the set of horizontal lines. Locating the second object may be based on a second determination that the second object is farther from the reference point than the first distance and closer than a second distance different from the first distance. Another view of the second object is obstructed by one of the set of vertical lines or the set of horizontal lines in the monocular image.

Continuing the example, the operations may cause the system to locate a third object of the set of objects behind the set of vertical lines and the set of horizontal lines based on a third determination that the third object is farther from the reference point than the second distance. The set of vertical lines and the set of horizontal lines overlap the third object in the monocular image.

According to another example, the operations may cause the system to determine that a first object of the set of objects is closer to the reference point than a second object of the set of objects, and that a third object of the set of objects is farther from the reference point than the second object. Further to this example, the operations may cause the system to move the second object. The second object is determined to be interposed between the first object and the third object in the monocular image.

As discussed herein, various non-limiting embodiments are directed to a system that may include a memory storing executable components and a processor, coupled to the memory, operable to execute or facilitate execution of one or more of the executable components. The executable components may include a distance measurement manager that may be configured to determine distance data comprising respective distances for a set of objects in stereoscopic data representing a stereoscopic view located within an area of view determined from a reference point determined by the system. The executable components may also include a conversion manager that may be configured to transform the stereoscopic data to monocular data representing a monocular view that comprises indications of the respective distances. Further, the executable components may include an output manager that may be configured to convey the monocular data to a display. The monocular view of the monocular data facilitates simulation of depth perception of the set of objects on the display.

According to an example, the executable components may further comprise a line placement component that may be configured to arrange a set of vertical lines and a set of horizontal lines within the monocular view of the monocular data. The set of vertical lines may represent a first distance from the reference point and the set of horizontal lines may represent a second distance from the reference point. Further, the executable components may include an object manipulation component that may be configured to interpose the set of objects relative to the set of vertical lines and the set of horizontal lines based on the respective distances from the reference point for the set of objects.

In another example, the set of objects may comprise a first object, a second object, and a third object. Further to this example, the executable components may further comprise an object manipulation component that may be configured to move at least the first object. The first object, the second object, and the third object may be layered as a function of the respective distances from the reference point for the set of objects.

According to a further example, the executable components may further comprise an image point component that may be configured to alter a focus point of an object of the set of objects based on a distance of the respective distances. The focus point may facilitate simulation of a spatial relationship between at least two objects of the set of objects on the display.

According to another example, the executable components may further comprise an object manipulation component that may be configured to alter respective brightness contrasts of at least two objects of the set of objects within the monocular view on the display. The respective brightness contrasts may facilitate simulation of a spatial relationship between the at least two objects on the display.

In accordance with another example, the output manager may be further configured to initiate the display of the monocular view on a heads up display during operation of a vehicle associated with the heads up display.

Another embodiment is directed to a method that may include capturing, by a system comprising a processor, a stereoscopic image based on a view area from a reference point determined by the system. The stereoscopic image may comprise objects. The method may also include determining respective depth indication data for a set of the objects based on respective depths of the set of the objects. The respective depths may be respective distances determined between the reference point and the set of the objects. Further, the method may include converting the stereoscopic image to a monocular image. The monocular image may comprise the depth indication data for the set of the objects. The method may also include initiating a presentation of the monocular image to a viewing device, wherein the monocular image simulates depth perception.

In an example, converting the stereoscopic image to the monocular image may include positioning a set of horizontal grid lines within the monocular image and positioning a set of vertical grid lines within the monocular image. The set of horizontal grid lines may represent a first depth and the set of vertical grid lines may represent a second depth. Further, the set of the objects may be interposed among the set of horizontal grid lines and the set of vertical grid lines based on the respective depths.

In another example, converting the stereoscopic image to the monocular image may include positioning a first set of lines of a first color and a second set of lines of a second color within the monocular image. The first color and the second color are different colors. Further, to his example, converting the stereoscopic image to the monocular image may include interposing the set of the objects among the first set of lines and the second set of lines. A perceived color of the first set of lines and the second set of lines may indicate depth perception.

Further to the above example, interposing the set of the objects may include locating a first object of the set of the objects coincident with the first set of lines and the second set of lines based on a first determination that the first object is closer to the reference point than a first distance. The first object may obstruct a view of the first set of lines and the second set of lines in the monocular image. Interposing the set of the objects may also include locating a second object of the set of the objects between the first set of lines and the second set of lines based on a second determination that the second object is farther from the reference point than the first distance and closer than a second distance different than the first distance. Another view of the second object may be obstructed by the first set of lines and the first color in the monocular image. Additionally, interposing the set of the objects may include locating a third object of the set of the objects behind the first set of lines and the second set of lines based on a third determination that the third object is farther from the reference point than the second distance. The first set of lines and the second set of lines overlap the third object in the monocular image.

According to another example, converting the stereoscopic image to the monocular image may include determining a first object of the set of the objects is closer to the reference point than a second object of the set of the objects, and a third object of the set of the objects is farther from the reference point than the second object. The method may also include moving the second object, wherein the second object is interposed between the first object and the third object in the monocular image.

In another example, converting the stereoscopic image to the monocular image may include altering a focus point of an object of the set of the objects resulting in an altered focus point, and wherein spatial relationships between the objects is defined in the monocular image based on the altered focus point. In a further example, converting the stereoscopic image to the monocular image may include altering a darkness property of an object of the set of the objects in the monocular image. The darkness property may indicate spatial relationships between the objects.

According to an example, converting the stereoscopic image to the monocular image may include extending a series of lines from a perimeter of an object of the set of the objects, wherein the series of lines intersect another series of lines extending from another perimeter of another object of the set of the objects. An intersection of the series of lines and the other series of lines may indicate relative depths of the object and the other object.

In another example, converting the stereoscopic image to the monocular image may include creating a transparent image of a first object. The transparent image may be larger than the first object and coincident with the first object. The method may also include creating another transparent image of a second object. The other transparent image may be larger than the second object and coincident with the second object. Further, the transparent image and the other transparent image may indicate depth perception.

According to another example, initiating the presentation of the monocular image to the viewing device comprises initiating a display of the monocular image by a heads up display device. In a further example, the viewing device may be at least one of an eye, an eyeball object, glasses, a wearable device, a vehicle windshield, or a display screen.

Example Computing Environment

Figure 18:
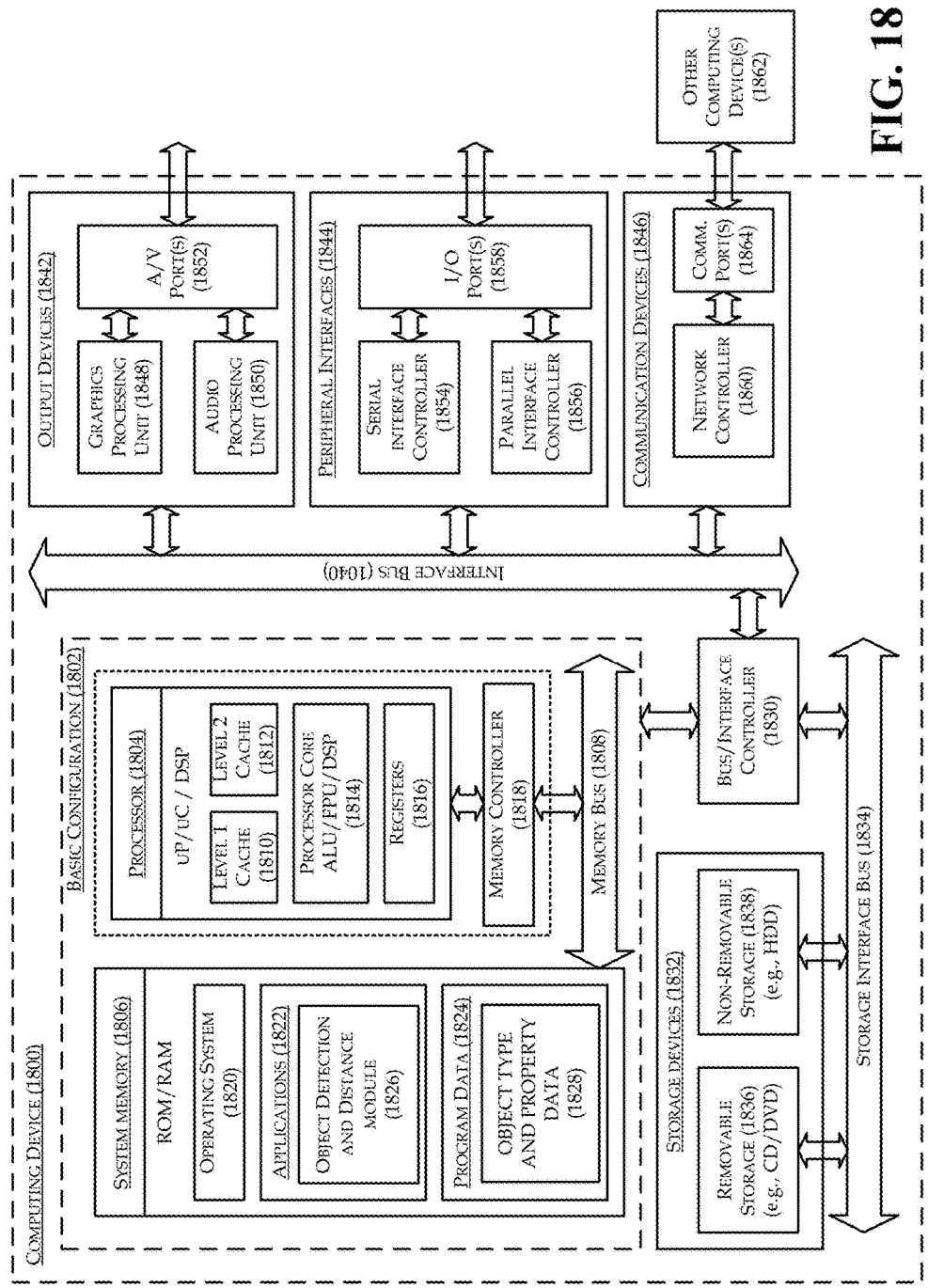
FIG. 18 is a block diagram illustrating an example computing device that is arranged for representing spatial and other relationships in accordance with at least some embodiments of the subject disclosure.

FIG. 18 is a block diagram illustrating an example computing device 1800 that is arranged for representing spatial and other relationships in accordance with at least some embodiments of the subject disclosure. In a very basic configuration 1802, the computing device 1800 typically includes one or more processors 1804 and a system memory 1806. A memory bus 1808 may be used for communicating between the processor 1804 and the system memory 1806.

Depending on the desired configuration, the processor 1804 may be of any type including but not limited to a microprocessor (µP), a microcontroller (µC), a digital signal processor (DSP), or any combination thereof. The processor 1804 may include one more levels of caching, such as a level one cache 1810 and a level two cache 1812, a processor core 1814, and registers 1816. An example processor core 1814 may include an arithmetic logic unit (ALU), a floating point unit (FPU), a digital signal processing core (DSP Core), or any combination thereof. An example memory controller 1818 may also be used with the processor 1804, or in some implementations, the memory controller 1818 may be an internal part of the processor 1804.

In an example, the processor 1804 may execute or facilitate execution of the instructions to perform operations that include determining respective distance data for a set of objects in a stereoscopic image captured based on a determined view area. The distance data may be based on respective distances between a reference point and the set of objects. The operations may also include generating a monocular image based on the stereoscopic image. The monocular image may include the set of objects and the distance data. The operations may also include rendering the monocular image in a display. The monocular image simulates spatial relationships between objects of the set of objects.

According to an implementation, the operations may include incorporating a set of vertical lines of a first color and a set of horizontal lines of a second color within the monocular image. The objects of the set of objects may be interposed among the set of vertical lines and the set of horizontal lines.

In another implementation, the operations may include locating a first object of the set of objects that is coincident with the set of vertical lines and the set of horizontal lines based on a first determination that the first object is closer to the reference point than a first distance. The first object obstructs a view of the set of vertical lines and the set of horizontal lines in the monocular image. The operations may also include locating a second object of the set of objects between the set of vertical lines and the set of horizontal lines based on a second determination that the second object is farther from the reference point than the first distance and closer than a second distance different from the first distance. Another view of the second object is obstructed by one of the set of vertical lines or the set of horizontal lines in the monocular image. Further, the operations may include locating a third object of the set of objects behind the set of vertical lines and the set of horizontal lines based on a third determination that the third object is farther from the reference point than the second distance. The set of vertical lines and the set of horizontal lines may overlap the third object in the monocular image.

According to another implementation, the operations may include determining that a first object of the set of objects is closer to the reference point than a second object of the set of objects, and that a third object of the set of objects is farther from the reference point than the second object. Further, the operations may include moving the second object, wherein the second object is determined to be interposed between the first object and the third object in the monocular image.

Depending on the desired configuration, the system memory 1806 may be of any type including but not limited to volatile memory (such as RAM), non-volatile memory (such as ROM, flash memory, etc.) or any combination thereof. The system memory 1806 may include an operating system 1820, one or more applications 1822, and program data 1824. The applications 1822 may include an object detection and distance module 1826 that is arranged to perform the functions as described herein including those described with respect to the system 300 of FIG. 3. The program data 1824 may include object type and property data 1828 that may be useful for operation with the object detection and distance module 1826 as is described herein. In some embodiments, the applications 1822 may be arranged to operate with the program data 1824 on the operating system 1820 such that a resource management for distributed computing games may be provided. This described basic configuration 1802 is illustrated in FIG. 18 by those components within the inner dashed line.

The computing device 1800 may have additional features or functionality, and additional interfaces to facilitate communications between the basic configuration 1802 and any required devices and interfaces. For example, a bus/interface controller 1830 may be used to facilitate communications between the basic configuration 1802 and one or more data storage devices 1832 via a storage interface bus 1834. The data storage devices 1832 may be removable storage devices 1836, non-removable storage devices 1838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1806, the removable storage devices 1836, and the non-removable storage devices 1838 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 1800. Any such computer storage media may be part of the computing device 1800.

The computing device 1800 may also include an interface bus 1840 for facilitating communication from various interface devices (e.g., output devices 1842, peripheral interfaces 1844, and communication devices 1846) to basic configuration 1802 via a bus/interface controller 1830. Example output devices 1842 include a graphics processing unit 1848 and an audio processing unit 1850, which may be configured to communicate to various external devices such as a display or speakers via one or more A/V ports 1852. Example peripheral interfaces 1844 may include a serial interface controller 1854 or a parallel interface controller 1856, which may be configured to communicate with external devices such as input devices (e.g., mouse, pen, voice input device, etc.) or other peripheral devices (e.g., printer, scanner, etc.) via one or more I/O ports 1858. An example communication device 1846 includes a network controller 1860, which may be arranged to facilitate communications with one or more other computing devices 1862 over a network communication link via one or more communication ports 1864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The subject disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which may, of course, vary. It is also to be understood that the terminology used herein is for the purpose of describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost versus efficiency tradeoffs. There are various vehicles by which processes and/or systems and/or other technologies described herein may be effected (e.g., hardware, software, and/or firmware), and that the selected vehicle will vary with the context in which the processes and/or systems and/or other technologies are deployed. For example, if an implementer determines that speed and accuracy are paramount, the implementer may select a mainly hardware and/or firmware vehicle; if flexibility is paramount, the implementer may select a mainly software implementation; or, yet again alternatively, the implementer may select some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Further, designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiments of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve a similar functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range may be recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "conversion manager" described in relation to FIG. 2 is also a feature in the aspect as shown in FIG. 3, FIG. 7, FIG. 10, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method, comprising:
   capturing, by a system comprising a processor, a stereoscopic image based on a view area from a reference point determined by the system, wherein the stereoscopic image comprises objects, and wherein the reference point includes an anticipated location of a user in a set amount of time;
   determining respective depth indication data for a set of objects based on respective depths of the set of objects, wherein the respective depths include respective distances determined between the reference point and the set of objects;
   converting the stereoscopic image to a monocular image, wherein the monocular image comprises the respective depth indication data for the set of objects, and wherein the converting the stereoscopic image to the monocular image comprises:
      determining that a first object of the set of objects is closer to the reference point than a second object of the set of objects, and that a third object of the set of objects is farther from the reference point than the second object; and
      artificially moving the second object relative to the first object and the third object in the monocular image, wherein the second object is interposed between the first object and the third object in the monocular image;
   initiating a presentation of the monocular image to a display device, wherein the monocular image simulates depth perception;
   detecting a movement of a gaze of the user from a distant object relative to the user to a closer object relative to the user; and
   generating, based on the detected movement of the gaze, a sound with a pitch that varies, wherein the variation in the pitch is a function of the movement of the gaze.

2. The method of claim 1, wherein the converting the stereoscopic image to the monocular image further comprises:
   positioning a set of horizontal grid lines within the monocular image; and
   positioning a set of vertical grid lines within the monocular image, wherein the set of horizontal grid lines represent a first depth and the set of vertical grid lines represent a second depth, and wherein the set of objects are interposed among the set of horizontal grid lines and the set of vertical grid lines based on the respective depths.

3. The method of claim 1, wherein the converting the stereoscopic image to the monocular image further comprises:
   positioning a first set of lines of a first color and a second set of lines of a second color within the monocular image, wherein the first color and the second color are different colors; and
   interposing the set of objects among the first set of lines and the second set of lines, wherein a perceived color of the first set of lines and the second set of lines indicates the depth perception.

4. A method, comprising:
- capturing, by a system comprising a processor, a stereoscopic image based on a view area from a reference point determined by the system, wherein the stereoscopic image comprises objects;
- determining respective depth indication data for a set of objects based on respective depths of the set of objects, wherein the respective depths include respective distances determined between the reference point and the set of objects;
- converting the stereoscopic image to a monocular image, wherein the monocular image comprises the respective depth indication data for the set of objects, and wherein the converting the stereoscopic image to the monocular image comprises:
  - positioning a first set of lines of a first color and a second set of lines of a second color within the monocular image, wherein the first color and the second color are different colors; and
  - interposing the set of objects among the first set of lines and the second set of lines, wherein a perceived color of the first set of lines and the second set of lines indicates depth perception, and wherein the interposing the set of objects comprises:
    - locating a first object of the set of objects coincident with the first set of lines and the second set of lines based on a first determination that the first object is closer to the reference point than a first distance, wherein the first object obstructs a view of the first set of lines and the second set of lines in the monocular image;
    - locating a second object of the set of objects between the first set of lines and the second set of lines based on a second determination that the second object is farther from the reference point than the first distance and closer than a second distance different than the first distance, wherein a view of the second object is obstructed by the first set of lines and the first color in the monocular image; and
    - locating a third object of the set of objects behind the first set of lines and the second set of lines based on a third determination that the third object is farther from the reference point than the second distance, wherein the first set of lines and the second set of lines overlap the third object in the monocular image; and
- initiating a presentation of the monocular image to a display device, wherein the monocular image simulates depth perception.

5. The method of claim 1, wherein the converting the stereoscopic image to the monocular image further comprises:
- altering a focus point of an object of the set of objects to result in an altered focus point, wherein spatial relationships between the objects of the set of objects is defined in the monocular image based on the altered focus point.

6. The method of claim 1, wherein the converting the stereoscopic image to the monocular image further comprises:
- altering a darkness property of an object of the set of objects in the monocular image, wherein the darkness property indicates spatial relationships between the objects of the set of objects.

7. A method, comprising:
- capturing, by a system comprising a processor, a stereoscopic image based on a view area from a reference point determined by the system, wherein the stereoscopic image comprises objects;
- determining respective depth indication data for a set of objects based on respective depths of the set of objects, wherein the respective depths include respective distances determined between the reference point and the set of objects;
- converting the stereoscopic image to a monocular image, wherein the monocular image comprises the respective depth indication data for the set of objects, wherein the converting the stereoscopic image to the monocular image comprises:
  - extending a series of lines from a perimeter of an object of the set of objects, wherein the series of lines intersect another series of lines that extend from another perimeter of another object of the set of objects, and wherein an intersection of the series of lines and the another series of lines indicates relative depths of the object and the another object; and
- initiating a presentation of the monocular image to a display device, wherein the monocular image simulates depth perception.

8. A method, comprising:
- capturing, by a system comprising a processor, a stereoscopic image based on a view area from a reference point determined by the system, wherein the stereoscopic image comprises objects;
- determining respective depth indication data for a set of objects based on respective depths of the set of objects, wherein the respective depths include respective distances determined between the reference point and the set of objects;
- converting the stereoscopic image to a monocular image, wherein the monocular image comprises the respective depth indication data for the set of objects, wherein the converting the stereoscopic image to the monocular image comprises:
  - creating a transparent image of a first object of the set of objects, wherein the transparent image is larger than the first object and coincident with the first object; and
  - creating another transparent image of a second object of the set of objects, wherein the another transparent image is larger than the second object and coincident with the second object, and wherein the transparent image and the another transparent image indicate depth perception; and
- initiating a presentation of the monocular image to a display device, wherein the monocular image simulates depth perception.

9. The method of claim 1, wherein the initiating the presentation of the monocular image to the display device comprises initiating a display of the monocular image by a heads up display device.

10. The method of claim 1, wherein the display device includes at least one of: an eye, an eyeball object, glasses, a wearable device, a vehicle windshield, or a display screen.

11. A system, comprising:
- a memory operable to store executable components;
- a processor, coupled to the memory, operable to execute or facilitate execution of one or more of the executable components, the executable components comprising:
  - a distance measurement manager configured to determine distance data that comprise respective distances for a set of objects in stereoscopic data representative of a stereoscopic view located within an area of view determined from a reference point, wherein the reference point includes an anticipated location of a user in a set amount of time, and wherein the anticipated location is calculated based on a current speed and a direction of movement of the user;
a conversion manager configured to transform the stereoscopic data to monocular data representative of a monocular view that comprises indications of the respective distances;
an object manipulation component configured to artificially move one or more objects of the set of objects relative to one or more other objects of the set of objects within the monocular data to demonstrate relative distances between the one or more objects and the one or more other objects; and
an output manager configured to convey the monocular data to a display device, wherein the monocular view representative of the monocular data facilitates simulation of depth perception of the set of objects on the display device; and
a camera, coupled to the processor and the memory, configured to detect a movement of a gaze of the user from a distant object relative to the user to a closer object relative to the user,
wherein the output manager is further configured to control generation of a sound with a pitch that varies, based on the detected movement of the gaze, and wherein the variation in the pitch is a function of the movement of the gaze.

12. The system of claim 11, wherein the executable components further comprise:
a line placement component configured to arrange a set of vertical lines and a set of horizontal lines within the monocular view representative of the monocular data, wherein the set of vertical lines represent a first distance from the reference point and the set of horizontal lines represent a second distance from the reference point, and
wherein the object manipulation component is configured to interpose the set of objects relative to the set of vertical lines and the set of horizontal lines based on the respective distances from the reference point for the set of objects.

13. The system of claim 11, wherein:
the set of objects comprise a first object, a second object, and a third object,
to artificially move the one or more objects of the set of objects relative to the one or more other objects of the set of objects within the monocular data, the object manipulation component is configured to artificially move at least the first object within the monocular view representative of the monocular data, and
the first object, the second object, and the third object are layered as a function of the respective distances from the reference point for the set of objects.

14. The system of claim 11, wherein the executable components further comprise an image point component configured to alter a focus point of an object of the set of objects based on a distance of the respective distances, and wherein the focus point facilitates simulation of a spatial relationship between at least two objects of the set of objects on the display device.

15. The system of claim 11, wherein the object manipulation component is configured to alter respective brightness contrasts of at least two objects of the set of objects within the monocular view on the display device, and wherein the respective brightness contrasts facilitate simulation of a spatial relationship between the at least two objects on the display device.

16. The system of claim 11, wherein the output manager is configured to initiate a display of the monocular view on a heads up display during operation of a vehicle associated with the heads up display.

17. A non-transitory computer-readable storage device comprising executable instructions that, in response to execution, cause a system comprising a processor to perform or control performance of operations that comprise:
determine respective distance data for a set of objects in a stereoscopic image captured based on a determined view area, wherein the distance data is based on respective distances between a reference point and the set of objects, wherein the reference point includes an anticipated location of a user in a set amount of time, and wherein the anticipated location is calculated based on a current speed and a direction of movement of the user;
generate a monocular image based on the stereoscopic image, wherein the monocular image comprises the set of objects and the respective distance data;
determine that a first object of the set of objects is closer to the reference point than a second object of the set of objects, and that a third object of the set of objects is farther from the reference point than the second object;
artificially move the second object within the monocular image, wherein the second object is determined to be interposed between the first object and the third object in the monocular image;
render the monocular image on a display device, wherein the monocular image simulates spatial relationships between objects that includes the first object, the second object, and the third object of the set of objects;
detect a movement of a gaze of the user from a distant object relative to the user to a closer object relative to the user; and
generate, based on the detected movement of the gaze, a sound with a pitch that varies, wherein the variation in the pitch is a function of the movement of the gaze.

18. The non-transitory computer-readable storage device of claim 17, wherein the operations further comprise:
incorporate a set of vertical lines of a first color and a set of horizontal lines of a second color within the monocular image, wherein the objects of the set of objects are interposed among the set of vertical lines and the set of horizontal lines.

19. The non-transitory computer-readable storage device of claim 18, wherein the operations further comprise:
locate a first object, of the set of objects, that is coincident with the set of vertical lines and the set of horizontal lines based on a first determination that the first object is closer to the reference point than a first distance, wherein the first object obstructs a view of the set of vertical lines and the set of horizontal lines in the monocular image;
locate a second object, of the set of objects, between the set of vertical lines and the set of horizontal lines based on a second determination that the second object is farther from the reference point than the first distance and closer than a second distance different than the first distance, wherein a view of the second object is obstructed by one of the set of vertical lines or the set of horizontal lines in the monocular image; and locate a third object, of the set of objects, behind the set of vertical lines and the set of horizontal lines based on a third determination that the third object is farther from the reference point than the second distance, wherein the set of vertical lines and the set of horizontal lines overlap the third object in the monocular image.

20. The system of claim 12, wherein to interpose the set of objects, the object manipulation component is configured to:

locate a first object, of the set of objects, coincident with the set of vertical lines and the set of horizontal lines based on a first determination that the first object is closer to the reference point than the first distance, wherein the first object obstructs a view of the set of vertical lines and the set of horizontal lines in the monocular data;

locate a second object, of the set of objects, between the set of vertical lines and the set of horizontal lines based on a second determination that the second object is farther from the reference point than the first distance and closer than the second distance different than the first distance, wherein a view of the second object is obstructed by one of the set of vertical lines and the set of horizontal lines in the monocular data; and locate a third object, of the set of objects, behind the set of vertical lines and the set of horizontal lines based on a third determination that the third object is farther from the reference point than the second distance, wherein the set of vertical lines and the set of horizontal lines overlap the third object in the monocular data.

21. The system of claim 11, wherein the executable components further comprise an intersection simulation component configured to:

extend a series of lines from a perimeter of an object of the set of objects, wherein the series of lines intersect another series of lines that extend from another perimeter of another object of the set of objects, and wherein an intersection of the series of lines and the another series of lines indicates relative depths of the object and the another object.

22. The system of claim 11, wherein the executable components further comprise an overlay component configured to:

create a transparent image of a first object of the set of objects, wherein the transparent image is larger than the first object and coincident with the first object; and create another transparent image of a second object of the set of objects, wherein the another transparent image is larger than the second object and coincident with the second object, and wherein the transparent image and the another transparent image indicate depth perception.

23. The non-transitory computer-readable storage device of claim 17, wherein the operations further comprise:

extend a series of lines from a perimeter of an object of the set of objects, wherein the series of lines intersect another series of lines that extend from another perimeter of another object of the set of objects, and wherein an intersection of the series of lines and the another series of lines indicate relative depths of the object and the another object.

24. The non-transitory computer-readable storage device of claim 17, wherein the operations further comprise:

create a transparent image of the first object of the set of objects, wherein the transparent image is larger than the first object and coincident with the first object; and create another transparent image of the second object of the set of objects, wherein the another transparent image is larger than the second object and coincident with the second object, and wherein the transparent image and the another transparent image indicate depth perception.

* * * * *

UNITED STATES PATENT AND TRADEMARK OFFICE
CERTIFICATE OF CORRECTION

PATENT NO. : 10,298,911 B2
APPLICATION NO. : 14/614763
DATED : May 21, 2019
INVENTOR(S) : Shuster et al.

Page 1 of 1

It is certified that error appears in the above-identified patent and that said Letters Patent is hereby corrected as shown below:

In the Claims

In Column 39, Line 25, please delete "object of the set of objects coincident" and insert -- object, of the set of objects, coincident -- therefor.

In Column 39, Line 32, please delete "object of the set of objects between" and insert -- object, of the set of objects, between -- therefor.

In Column 39, Line 41, please delete "object of the set of objects behind" and insert -- object, of the set of objects, behind -- therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*